US011920005B2

(12) United States Patent
Fan et al.

(10) Patent No.: US 11,920,005 B2
(45) Date of Patent: Mar. 5, 2024

(54) USE OF MULTIFUNCTIONAL CO2 FOR DEPOLYMERIZATION OF POLYETHYLENE TEREPHTHALATE

(71) Applicants: University of Wyoming, Laramie, WY (US); Washington State University, Pullman, WA (US)

(72) Inventors: Maohong Fan, Ames, IA (US); Wenyang Lu, Laramie, WY (US); Jinwen Zhang, Pullman, WA (US)

(73) Assignees: UNIVERSITY OF WYOMING, Laramie, WY (US); WASHINGTON STATE UNIVERSITY, Pullman, WA (US)

( * ) Notice: Subject to any disclaimer, the term of this patent is extended or adjusted under 35 U.S.C. 154(b) by 370 days.

(21) Appl. No.: 17/246,204

(22) Filed: Apr. 30, 2021

(65) Prior Publication Data
US 2021/0340351 A1 Nov. 4, 2021

Related U.S. Application Data

(60) Provisional application No. 63/018,189, filed on Apr. 30, 2020.

(51) Int. Cl.
C08J 11/14 (2006.01)
B01J 3/00 (2006.01)
B01J 3/02 (2006.01)

(52) U.S. Cl.
CPC .............. *C08J 11/14* (2013.01); *B01J 3/008* (2013.01); *B01J 3/02* (2013.01); *C08J 2367/02* (2013.01)

(58) Field of Classification Search
USPC .......................................... 521/48
See application file for complete search history.

(56) References Cited

U.S. PATENT DOCUMENTS 5,554,657 A * 9/1996 Brownscombe ......... C08J 11/08
528/502 A

OTHER PUBLICATIONS

Caccamo, M. T., & Magazù, S. (2017). Ethylene Glycol-Polyethylene Glycol (EG-PEG) Mixtures: Infrared Spectra Wavelet Cross-Correlation Analysis. Applied spectroscopy, 71(3), 401-409.
Carta, D., Cao, G., & D'Angeli, C. (2003). Chemical recycling of poly (ethylene terephthalate)(PET) by hydrolysis and glycolysis. Environmental Science and Pollution Research, 10(6), 390-394.
Cata, A., Miclau, M., lenascu, I., Ursu, D., Tanasie, C., & Stefanut, M. N. (2015). Chemical recycling of polyethylene terephthalate (pet) waste using sub-and supercritical water. Rev Roum Chim, 60, 579-585.
Chazallon, B., Celik, Y., Focsa, C., & Guinet, Y. (2006). Vapor deposited ethanol-H2O ice mixtures investigated by micro-Raman scattering. Vibrational spectroscopy, 42(2), 206-214.
Dubelley, F., Planes, E., Bas, C., Pons, E., Yrieix, B., & Flandin, L. (2017). The hygrothermal degradation of PET in aminated multilayer. European Polymer Journal, 87, 1-13.
Edge, M., et al. "Characterisation of the species responsible for yellowing in melt degraded aromatic polyesters—I: Yellowing of poly (ethylene terephthalate)." Polymer degradation and stability 53.2 (1996): 141-151.
Edsall, J. T. (1936). Raman spectra of amino acids and related compounds I. The ionization of the carboxyl group. The Journal of Chemical Physics, 4(1), 1-8.
Ewender, J., Franz, R., Mauer, A., & Welle, F. (2003). Determination of the migration of acetaldehyde from PET bottles into non-carbonated and carbonated mineral water. Deutsche Lebensmittelrundschau, 99(6), 215-221.
Furić, K., Mohaček, V., Bonifačić, M., & Štefanić, I. (1992). Raman spectroscopic study of H2O and D2O water solutions of glycine. Journal of Molecular structure, 267, 39-44.
Hannah Ritchie and Max Roser (2018)—"Plastic Pollution". Published online at OurWorldInData.org. Retrieved from: https://ourworldindata.org/plastic-pollution.
Harper, J. J., & Janik, P. (1970). Terephthalic acid solubility. Journal of Chemical and Engineering Data, 15(3), 439-440.
https://www.plasticseurope.org/application/files/9715/7129/9584/FINAL_web_version_Plastics_the_facts2019_14102019.pdf, 49 pages.
Ioakeimidis, C., et al. "The degradation potential of PET bottles in the marine environment: An ATR-FTIR based approach." Scientific reports 6.1 (2016): 1-8.
Kim, B. K., Hwang, G. C., Bae, S. Y., Yi, S. C., & Kumazawa, H. (2001). Depolymerization of polyethyleneterephthalate in supercritical methanol. Journal of applied polymer science, 81(9), 2102-2108.
Li, Xue-Kun, et al. "Reaction kinetics and mechanism of catalyzed hydrolysis of waste PET using solid acid catalyst in supercritical CO2." AIChE Journal 61.1 (2015): 200-214.
Moore, M. H., & Khanna, R. K. (1991). Infrared and mass spectral studies of proton irradiated H2O+ CO2 ice: Evidence for carbonic acid. Spectrochimica Acta Part A: Molecular Spectroscopy, 47(2), 255-262.
Otton, J., Ratton, S., Vasnev, V. A., Markova, G. D., Nametov, K. M., Bakhmutov, V. I., . . . & Korshak, V. V. (1988). Investigation of the formation of poly (ethylene terephthalate) with model molecules: kinetics and mechanisms of the catalytic esterification and alcoholysis reactions. II. Catalysis by metallic derivatives (monofunctional reactants). Journal of Polymer Science Part A: Polymer Chemistry, 26(8), 2199-2224.
Pereira, Ana Paula dos Santos, et al. "Processing and characterization of PET composites reinforced with geopolymer concrete waste." Materials Research 20 (2017): 411-420.

(Continued)

*Primary Examiner* — Terressa Boykin
(74) *Attorney, Agent, or Firm* — Goodhue, Coleman & Owens, P.C.

(57) ABSTRACT

A high-efficiency, low-energy consumption and environmental-friendly recycling technology for PETE plastic waste is disclosed. The degradation of PETE plastic waste includes a method for attacking the —O— ester linkage in the repeat unit of PETE plastic with water in saturated pressure and $CO_2$ in supercritical (Sc) conditions.

6 Claims, 23 Drawing Sheets

(56) References Cited

OTHER PUBLICATIONS

Scaffaro, R., Botta, L., Ceraulo, M., & La Mantia, F. P. (2011). Effect of kind and content of organo-modified clay on properties of PET nanocomposites. Journal of Applied Polymer Science, 122(1), 384-392.

Schwartz, M. (1977). Raman study of the conformational equilibrium of ethylene glycol in dimethyl sulfoxide. Spectrochimica Acta Part A: Molecular Spectroscopy, 33(11), 1025-1032.

Shukla, S. R., & Harad, A. M. (2006). Aminolysis of polyethylene terephthalate waste. Polymer degradation and stability, 91(8), 1850-1854.

Sinha, V., Patel, M. R., & Patel, J. V. (2010). PET waste management by chemical recycling: a review. Journal of Polymers and the Environment, 18(1), 18 pages.

Stuart, A. V., and G. B. B. M. Sutherland. "Effect of hydrogen bonding on the deformation frequencies of the hydroxyl group in alcohols." The Journal of Chemical Physics 24.3 (1956): 559-570.

Toews, K. L., Shroll, R. M., Wai, C. M., & Smart, N. G. (1995). pH-defining equilibrium between water and supercritical $CO_2$. Influence on SFE of organics and metal chelates. Analytical Chemistry, 67(22), 4040-4043.

Tournier, V., Topham, C. M., Gilles, A., David, B., Folgoas, C., Moya-Leclair, E., . . . & Marty, A. (2020). An engineered PET depolymerase to break down and recycle plastic bottles. Nature, 580(7802), 216-219.

Yoshioka, T., Okayama, N., & Okuwaki, A. (1998). Kinetics of hydrolysis of PET powder in nitric acid by a modified shrinking-core model. Industrial & engineering chemistry research, 37(2), 336-340.

Zhang, H., & Wen, Z. G. (2014). The consumption and recycling collection system of PET bottles: A case study of Beijing, China. Waste Management, 34(6), 987-998.

Zhou, X., Wang, C., Fang, C., Yu, R., Li, Y., & Lei, W. (2019). Structure and thermal properties of various alcoholysis products from waste poly (ethylene terephthalate). Waste Management, 85, 164-174.

* cited by examiner

USE OF MULTIFUNCTIONAL CO2 FOR DEPOLYMERIZATION OF POLYETHYLENE TEREPHTHALATE

PRIORITY STATEMENT

This application claims priority under 35 U.S.C. § 119 to provisional application Ser. No. 63/018,189 titled "AN ENVIRONMENTALLY FRIENDLY METHOD FOR RECYCLING POLYETHYLENE TEREPHTHALATE (PETE)" and filed on Apr. 30, 2020 all of which is hereby incorporated by reference in its entirety.

FIELD OF THE INVENTION

The present invention relates to recycling polyethylene terephthalate. More particularly, but not exclusively, the present invention relates to Use of Multifunctional CO2 for Depolymerization of Polyethylene Terephthalate.

BACKGROUND

I. Field of the Disclosure

The present disclosure relates to a high-efficiency, low-energy consumption, and environmental-friendly recycling technology for PETE plastic waste. Particularly, but not exclusively, the present disclosure relates to the degradation of PETE plastic waste by attacking the —O— ester linkage in the repeat unit of PETE plastic with water in saturated pressure and $CO_2$ in supercritical (Sc) conditions.

II. Description of the Prior Art

Waste plastics are the materials consisting of any of a wide range of synthetic or semi-synthetic organic compounds. The synthetic plastics do not rust or rot or are not easily degraded in the outdoor environment and will be accumulated in the landfill site or in the natural environments if not treated properly, which is urgently needed for recycling technology applied. Thus, extensive use of plastics can lead to the waste disposal management difficulties and serious environmental problems such as intensive energy consumption, toxic gas emission and occupying a large amount of landfill. Therefore, there is a need to provide a high-efficiency, low-energy consumption, and environmental-friendly recycling technology for PETE plastic waste.

SUMMARY

Therefore, it is a primary object, feature, or advantage of the disclosure to improve over the state of the art.

It is a further object, feature, or advantage to provide a high-efficiency, low-energy consumption, and environmental-friendly recycling technology for PETE plastic waste.

It is another object, feature, or advantage to provide for the degradation of PETE plastic waste by attacking the —O— ester linkage in the repeat unit of PETE plastic with water in saturated pressure and $CO_2$ in supercritical (Sc) conditions.

Another object, feature, or advantage is to provide a de-linkage process that breaks the chemical bond in PETE plastic and leads to further hydrolysis.

Still another object, feature, or advantage is to provide a de-linkage process that can be extended to investigate the operating conditions as well the PETE plastics degradation mechanism.

Yet another object, feature, or advantage is to provide an environmental-friendly, de-linkage process for the degradation of PETE plastic waste under a mild operation condition in a supercritical $CO_2$ and water system.

According to another exemplary aspect, a method for recycling polyethylene terephthalate (PETE) is disclosed. The method includes, for example, such steps as, pre-loading a reactor with a ratio of a polyethylene terephthalate and a deionized (DI) water, injecting a $CO_2$ into the reactor at an injection pressure, and heating the ratio of the polyethylene terephthalate and the deionized water and the $CO_2$ within the reactor to a reaction temperature and for a reaction time. The method further includes reacting the polyethylene terephthalate with the deionized water and the $CO_2$, converting the polyethylene terephthalate to a liquid product and a solid product in the reactor, and collecting the liquid product and the solid product from the reactor.

According to at least one other exemplary aspect, a method for recycling polyethylene terephthalate (PETE) by depolymerizing the PETE is disclosed. The method includes, for example, such steps as, pre-loading a reactor with a weight ratio of a polyethylene terephthalate and a deionized (DI) water, injecting $CO_2$ into the reactor at an injection pressure, sealing the weight ratio of the polyethylene terephthalate and the deionized water and the $CO_2$ within the reactor, heating the weight ratio of the polyethylene terephthalate and the deionized water and the $CO_2$ within the reactor to a reaction temperature and reacting the weight ratio of the polyethylene terephthalate and the deionized water and the $CO_2$ within the reactor for a reaction duration.

According to at least one other exemplary aspect, an environmentally friendly method for recycling polyethylene terephthalate (PETE) is disclosed. The method includes, for example, such steps as, pre-loading a supercritical high temperature reactor with a weight ratio of a polyethylene terephthalate and a deionized (DI) water in excess of 1:10, injecting $CO_2$ into the supercritical high temperature reactor at an injection pressure in excess of 500 psi, sealing the weight ratio of the polyethylene terephthalate and the deionized water and the $CO_2$ within the supercritical high temperature reactor, setting a reaction temperature of the supercritical high temperature reactor with a controller, wherein the reaction temperature is in excess of 160° C., heating the weight ratio of the polyethylene terephthalate and the deionized water and the $CO_2$ within the supercritical high temperature reactor to the reaction temperature, and reacting the weight ratio of the polyethylene terephthalate and the deionized water and the $CO_2$ within the reactor for a reaction duration in excess of 0.25 hrs.

One or more of these and/or other objects, features, or advantages of the present disclosure will become apparent from the specification and claims that follow. No single aspect need provide every object, feature, or advantage. Different embodiments may have different objects, features, or advantages. Therefore, the present disclosure is not to be limited to or by any objects, features, or advantages stated herein.

BRIEF DESCRIPTION OF THE DRAWINGS

Illustrated embodiments of the disclosure are described in detail below with reference to the attached drawing figures, which are incorporated by reference herein, and where.

BRIEF DESCRIPTION OF THE TABLES

Figure 1:
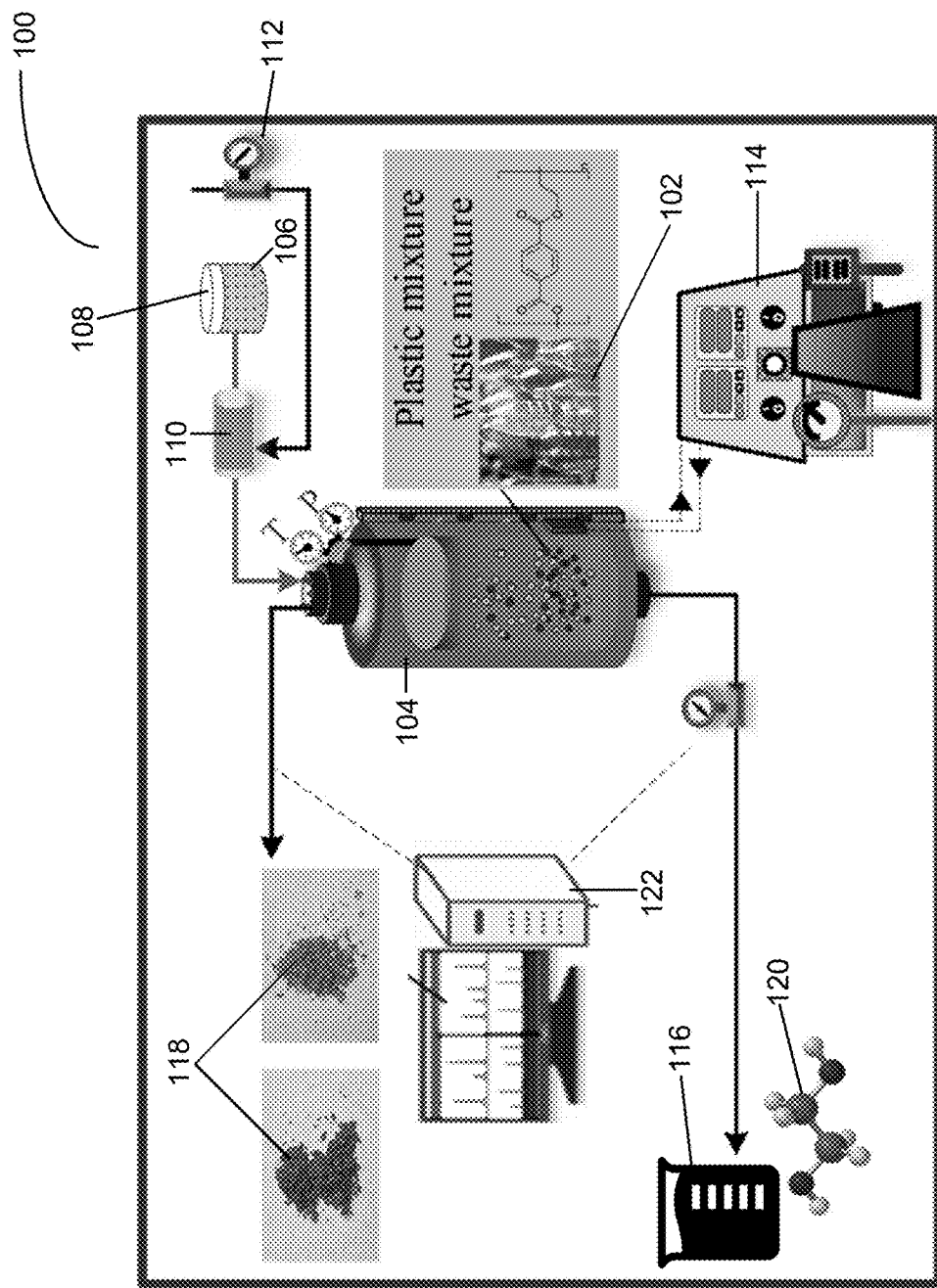
FIG. 1 is a systematic diagram process of supercritical $CO_2$ and water system for PETE plastic waste degradation in accordance with an exemplary aspect of the disclosure.

Illustrated embodiments of the disclosure are described in detail below with reference to the attached Tables, which are incorporated by reference herein, and where:

Table 1 shows exemplary bands with assigned vibrational modes from FTIR spectrum of the liquid samples; and Table 2 shows exemplary bands with assigned vibrational modes from FTIR spectrum of the solid samples.

DETAILED DESCRIPTION 1.0 Introduction

Waste plastics are the materials consisting of any of a wide range of synthetic or semi-synthetic organic compounds. Human society cannot live or progress without plastics. The synthetic plastics do not rust or rot or not easily degraded in the outdoor environment and will be accumulated in the landfill site or in the natural environments if not treated properly. Thus, extensive use of plastics can lead to the waste disposal management difficulties and serious environmental problems such as intensive energy consumption, toxic gas emission and occupying a large amount of landfill. According to a business analysis report from PlasticsEurope and a scientific report from University of Oxford, the global plastics production reached 359 million in the year of 2019 and 55% of the global plastics were discarded, 25% of the plastics were incinerated and only 20% of the plastics were recycled. The current plastics recycling technology include, 1) primary recycling (pre-consumer industrial scrap) that can recycle the unused single-type plastic wastes; 2) mechanical recycling (secondary recycling) that can separate the waste plastics with its contaminants before further post-treatment to convert the waste plastic material into environmental-friendly or reusable materials; 3) chemical recycling (tertiary recycling) that is unlike physical recycling, which involves transformation of polymer chains in the waste plastics and degradation of the waste plastics into monomer units or randomly ruptured into larger chain fragments with associated formation of gaseous products; and 4) biological recycling (quaternary recycling) that aims to degrade the waste plastics using microorganism or biological enzyme technologies, which recovers energy that is mainly conducted by incineration.

The abovementioned technologies suffer from many difficulties. For example, it is very hard to obtain a single type of plastic waste because the waste plastics are usually mixed with other additives or metallic catalysts during chemical production. Thus, it typically requires more procedures to process the waste plastics before degradation of plastics into second-grade materials. Physical recycling is also an energy-intensive process for recycling plastics where the basic polymer is not altered after-the-fact. Thus, the physical recycling of waste plastics requires relatively higher standards for the process management and operation conditions, especially in food production or healthcare-related industries. Chemical recycling is also typically environmental toxic as is uses solvents during the process, such as hexane, dichloromethane, xylene, tetrachloroethylene, benzyl alcohol, and cyclohexanone. Biological recycling methods are relatively environmental-friendly and the living environments for the living creatures or organic matters are high; however, the overall efficiency of recycling efficiency is low. The incineration recycling method can cause major toxic gases and liquid pollutions during and as a result of the processes. To eliminate the negative environmental impact caused by post-consumer PET (PPET) waste, attempts were made to convert PPET into environmentally friendly substances or high value-added products.

PETE plastic account for ~8% of the total waste plastics. Degradation of PETE plastic can be difficult due to its harsh reaction conditions. The crystalline melting temperature for PETE plastic is 260° C. and the polymer chain in PETE plastic's mechanical strength, toughness and fatigue resistance temperature can reach as high as 150-175° C., and it shows superior chemical, hydrolytic and organic solvent resistance. The state-of-the-art recycling technology for PETE plastic has fallbacks and deficiencies. For example, 1) mechanical recycling suffers from the plastic mixtures separation and classification difficulties before recycling processes; 2) chemical recycling uses toxic organic solvents during the processes; and 3) incineration recycling causes toxic gases emission problems.

One possible pathway solution to address PPET upcycling problem is chemically upcycling PPET due to their ester groups which can be hydrolyzed with either an acid or a base. The state-of-art hydrolysis of PET requires either highly acidic or basic condition, which could lead to secondary pollutions in the post-reaction solutions.

Supercritical fluids were applied to the hydrolysis of PET due to their reactivity. The process of hydrolysis of PET under supercritical fluid can avoid toxic and hazardous pollutants before being released into the environment. The energy consumption for the fluid to reach its supercritical state is very large. The fluid remained in the post-reaction can also contaminate generated products or cause further separation complexity.

To overcome abovementioned challenges, a low energy consumption and environmentally friendly PET plastic conversion technology was developed. The conversion of PET is performed in the supercritical $CO_2$ (Sc$CO_2$) and water under mild operation conditions. Sc$CO_2$ was found to be served as an effective hydrolysis catalyst for PET. Furthermore, when the reaction was terminated, Sc$CO_2$ was recovered in terms of gas status without causing products contamination and post-reaction solution pollutions. The variation of the distribution of the products with the reaction conditions, cyclability of system and the conversion mechanism is discussed in this study.

2.0 Experimental

Thus, it is a primary object, feature and advantage of the disclosure to develop a high-efficiency, low-energy consumption and environmental-friendly recycling technology for PETE plastic waste. An exemplary method for degradation of PETE plastic waste is to attack the —O— ester linkage in the repeat unit of PETE plastic with water in saturated pressure and $CO_2$ in supercritical (Sc) conditions. The de-linkage process can break the chemical bond in PETE plastic and lead to the further hydrolysis process in the abovementioned conditions. The present disclosure can be extended for hypothesis and investigation of the operating conditions as well as the PETE plastics degradation mechanism.

2.1. Exemplary Materials

Figure 2B:
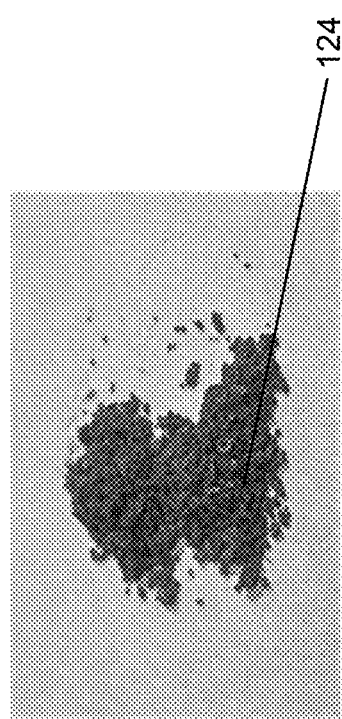
FIGS. 2B-2C illustrate exemplary morphologies of sheet and powder products from PETE plastic degradation.
Figure 2C:
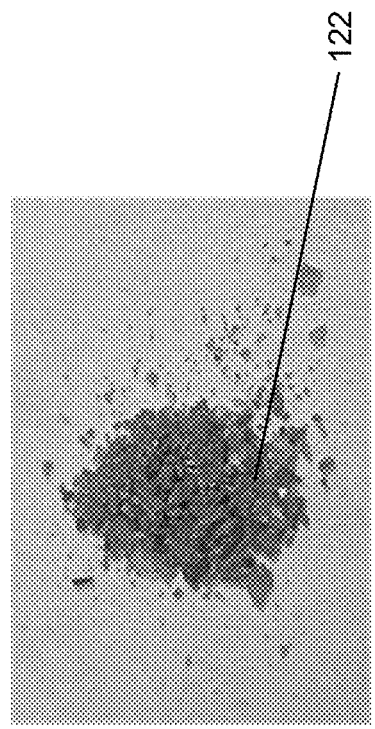
Figure 2A:
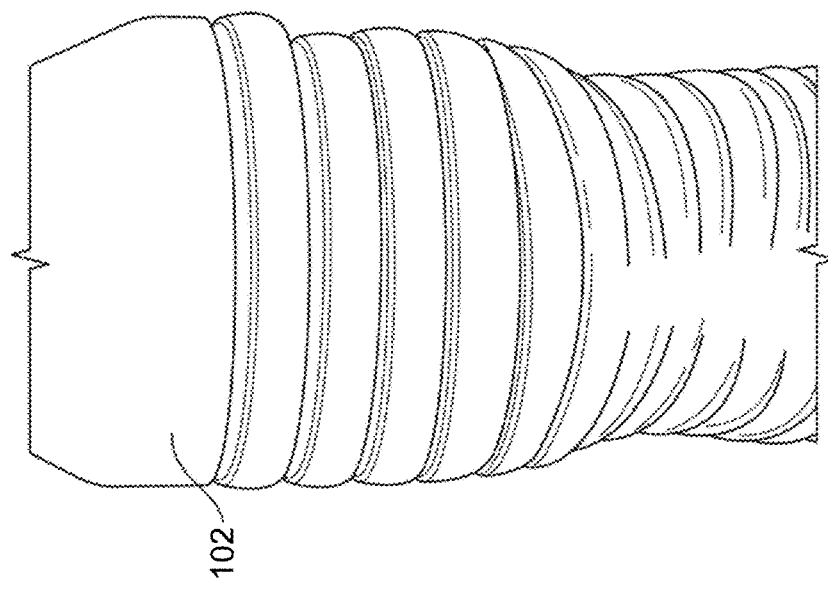
FIG. 2A illustrates a PETE plastic water bottle.

The disclosure uses, by way of exemplary materials, PETE plastic 102 from water bottle, as shown in FIG. 2A, produced by Kirkland's, Inc. Company, Deionized water (DI water) obtained from Combination Reverse Osmosis plus Type II DI Systems; Liquid $CO_2$ (UHP, 99.999%) was provided by United States Welding, Inc.

2.2. Exemplary Equipment and Procedures

The reaction was conducted in the 100 ml-HPR-series chemical batch reactor 104 from Supercritical Fluid Technology, Inc. First, PETE plastic 102 or PET plastic 102 was selected from a middle region of the water bottle, as shown in FIG. 2A, this region was 7 cm from the top and 5 cm from the bottom of the water bottle. For each test, the PETE or PET plastic 102 was cut in the shape of rectangle with length of 3 cm and width of 2 cm, (~0.0910 g or 1 g). The PETE/PET plastic sample 102 can be the entire bottle, half the bottle, top region of the bottle, bottom region of the bottle, middle region of the bottle or a mixture of different areas of the water bottle. Second, the reactor 104 was pre-loaded with PETE plastic 102 and water 106 with predetermined weight ratio of PETE plastic 102 to DI water 106 of 1:10, 1:15, 1:20, 1:25 and 1:30, respectively. The water 106 may be obtained from a water tank 108 as shown in FIG. 1. The water may travel through a humidifier 110 before entering the reactor. Liquid $CO_2$ 112 was then injected into the reaction tank before sealing the reactor to keep a constant inside pressure, such as 700 psi. The injection pressure may be in excess of 500 psi or less than 500 psi. The injection pressure may also be less than 1000 psi or greater than 1000 psi. The liquid $CO_2$ may travel through the humidifier prior to entering the reactor, as shown in FIG. 1. Third, the controller 114 of the reactor may be adjusted to bring the reactor to a pre-determined temperature such as 160° C., 180° C., 200° C., 220° C., and 240° C., respectively. The controller 114 may also adjust the pressure of the reactor 104. The reaction time durations were 0.25 hrs, 0.5 hrs, 1 hr, 1.5 hrs and 2 hrs, respectively. After each reaction, when the reactor tank 104 recovers to room temperature and is unsealed. The products, terephthalic acid (TPA) and ethylene glycol (EG), may be a liquid product 116, a solid product 118, or both is collected from the reactor 104. The liquid product may contain plastic recycling driving ethylene glycol 120. The liquid product 116 was filtered with the 0.1 mm filtration paper before further analysis. The solid product 118 may contain plastic recycling driving polyenes and benzoic acid crystals. Solid product 118 was dried in the dry oven at 105° C. for 2 hrs. Analysis of the product may be conducted by a data acquisition unit 122. An exemplary systematic diagram process 100 is shown in FIG. 1. The $CO_2$ may be recovered in gas form or in liquid form and reused.

2.3. Exemplary Measurements

The collected products include three parts, and the morphologies of the solid product 118 are shown in FIG. 2B and FIG. 2C. The first part was a liquid product 116, shown in FIG. 1, that was measured to detect the concentration of hydrogen ion using an S220-Kit pH meter (i.e., elemental analyzer) produced by Mettler Toledo SevenCompact, Inc. A Fourier-transform infrared spectroscopy (FTIR) device (i.e., FTIR instrument) was used to detect light absorption of different chemical molecular group/cluster or chemical bond in a wide wavenumber. The second and third sample were solid products 118 which included sheet solid 122 and powder 124 samples, as shown in FIG. 2B and FIG. 2C, that were measured by the elemental analyzer and FTIR instrument.

To quantitatively analyze the yield of liquid products 116 and solid products 118. Agilent 7890A Gas Chromatography equipped with one HP-PlotQ column was applied for measuring the liquid products 116. The injection volume is 2 uL and the split ratio is 1:10. The TPA was recovered by diluted the liquid-solid mixtures with 50 mL cold water. The pH of the mixture solution is adjusted to 11 via 1 mol/L NaOH solution. The obtained solution consists of liquid products 116, the sodium salt of TPA, and unreacted PET particles. 0.1 mm filtration paper was applied to separate the unreacted PET. Adjusting the pH of filtrates to 1-3 via 5 mol/L $H_2SO_4$ solution. TPA was precipitated in the form of white flocculent. After separating the solution and dry the white flocculent at 105° C. for 12 h. The white or light-yellow sheet-like TPA product was obtained. The conversion ratio of PET was calculated according to the following equation (E1), the yield of TPA, EG, and acetaldehyde was calculated according to the equation (E2), (E3) and (E4), respectively.

$$PET \text{ Conversion ratio} = \frac{\text{Original } PETE \text{ plastic (mole)} - \text{Unreacte } PETE \text{ plastic (mole)}}{\text{Original } PETE \text{ plastic (mole)}} \times 100\% \quad (E1)$$

$$\text{Yield of } TPA = \frac{\text{Experimental obtained } TPE \text{(mole)}}{\text{Theoretical } TPA \text{ generated from completely depolymerization of } PET \text{(mole)}} \times 100\% \quad (E2)$$

$$\text{Yield of } EG = \frac{\text{Experimental obtained } EG \text{(mole)}}{\text{Theoreticall } EG \text{ generated from completely depolymerization of } PET \text{(mole)}} \times 100\% \quad (E3)$$

$$\text{Yield of acetaldehyde} = \frac{\text{Experimental obtained acetaldehyde (mole)}}{\text{Theoreticall acetaldehyde generated from completely conversion of } EG \text{(mole)}} \times 100\%. \quad (E4)$$

3.0. Exemplary Results and Discussion

3.1. PETE Plastic Degradation Ratio and Liquid Product Acidity

Figure 3A:
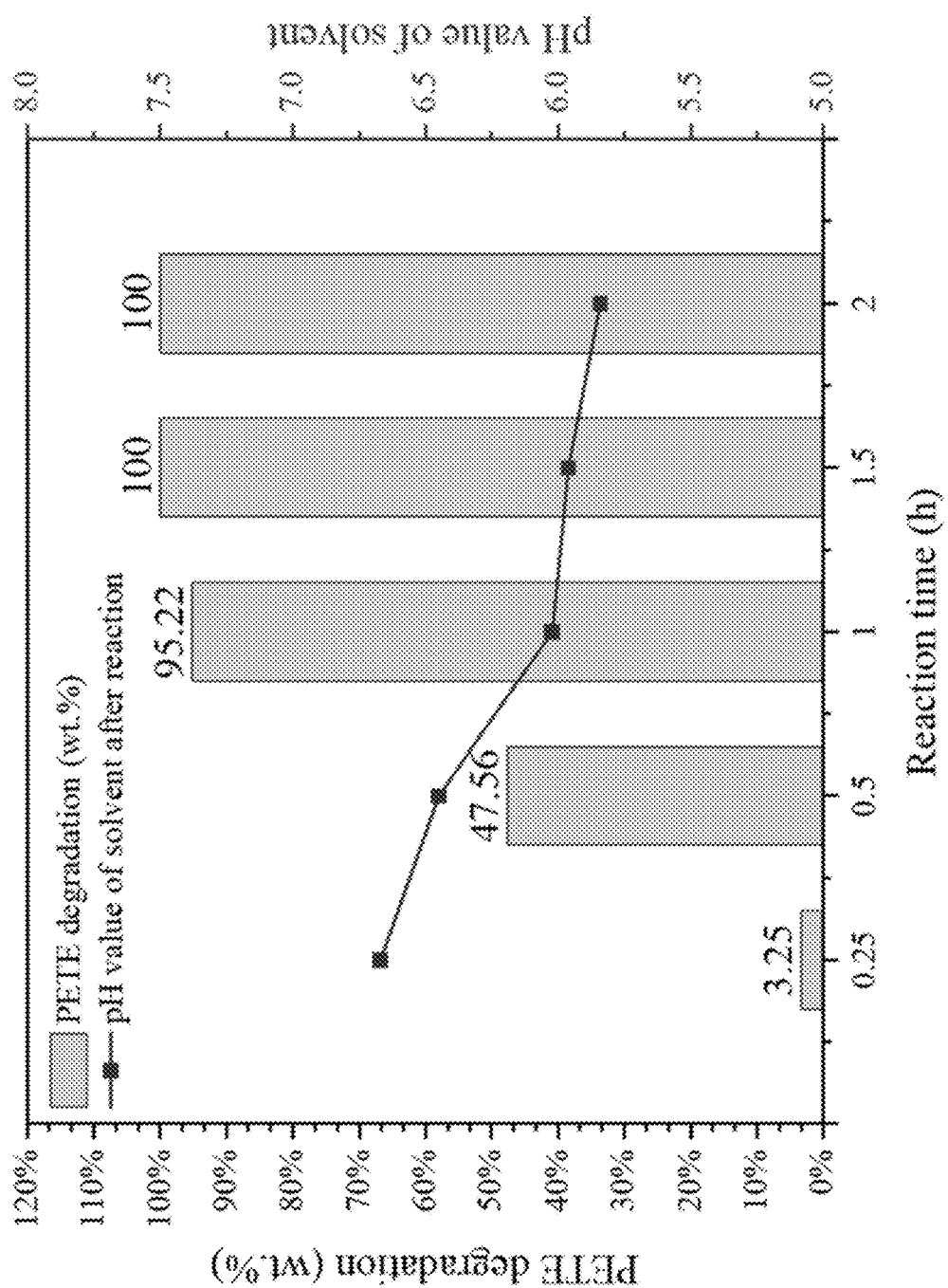
FIG. 3A shows an exemplary plot for PETE plastic degradation ratio versus reaction time and solvent pH value.
Figure 3B:
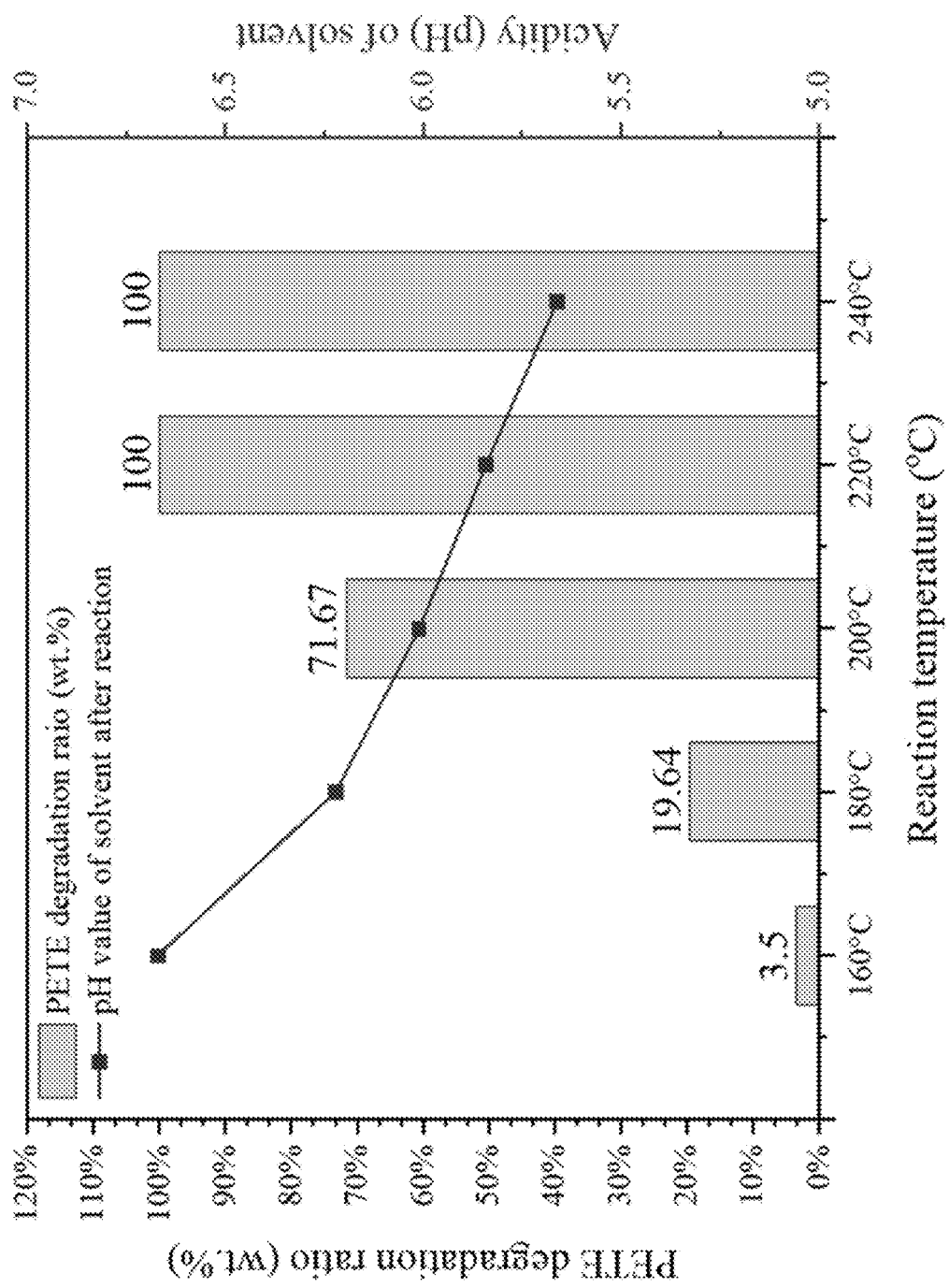
FIG. 3B shows an exemplary plot for PETE plastic degradation ratio versus reaction temperature and solvent pH value.

Plots for the degradation ratio of PETE plastic 102 at different temperatures, reaction time and the weight ratio of PETE plastic 102 to DI water 108 are shown in FIGS. 3A-3B. In FIG. 3A, the operational conditions were: (1) initial pressure: 700 psi $CO_2$ 112; (2) reaction temperature: 220° C.; (3) reaction time: 0-2 hrs; and (4) weight ratio of PETE plastic 102 to DI water 108 equals 1:30. PETE plastic degradation ratio (wt. %) increases with reaction time and reaches as high as 100% at 1.5 h and 2 h test. The results indicate that the reaction time is a key parameter for the degradation process. The PETE plastic consists of polymerized units of the monomer ethylene terephthalate, with repeating $(C_{10}H_8O_4)$ units. The repeating units of ethylene terephthalate contain a relatively stable carbonyl linkage in the ester linkage that is very hard to break. Thus, more energy is needed to attack and break the polymerized units of ethylene terephthalate. On the other hand, in the 1 h and 1.5 h tests, the increase of degradation ratio of PETE plastic is much lower than that of other tests. Most of the breaking process is finished in the first eight hours, the remaining materials are degraded to mono-polymer or other intermediates. The acidity of the liquid increases with the reaction time and reaches the lowest value of 5.84. In other aspects the acidity may be higher or lower. The increase of acidity of the liquid samples can be explained from two aspects, 1) unreacted $CO_2$ was dissolved in the DI water to form $H_2CO_3$ and $HCO_3^-$; and 2) in the process of PETE plastic degradation, ethylene glycol was formed and dissolved in DI water that appears weakly acidic.

In FIG. 3B, the operational conditions were: (1) initial pressure: 700 psi $CO_2$ 112; (2) reaction temperature: 0-240° C.; and (3) weight ratio of PETE plastic 102 to DI water 108 equals 1:30. In FIG. 3B, PETE plastic degradation ratio (wt. %) increases with reaction temperature, while, during the low reaction temperature range (160° C. and 180° C.), the degradation ratio is 3.5% and 19.64%, which results because the minimum temperature and pressure required for supercritical phase $CO_2$ 112 is 31.0° C. and 1070 psi, while, the highest pressure recorded at 160° C. and 180° C. test was 950 psi and 1050 psi. The phase of $CO_2$ 112 in the reaction system is gas in low reaction temperatures and the reaction occurs very slowly. From the test of reaction temperature at 200° C. and higher, the recorded reaction pressures are 1500 psi, 1900 psi and 2300 psi, respectively. This means the phase of $CO_2$ 112 in the reaction system changes from gas to supercritical fluid. The synergy effect of Sc-$CO_2$ 112 and water 108 can significantly promote the degradation ratio of PETE plastic. FIG. 3B shows that the degradation ratio of PETE plastic increases 264.92% from 180° C. to 200° C. tests and the acidity of liquid sample increases significantly due to more ethylene glycol being generated during the degradation process. On the other hand, when reaction temperature increases from 200° C. to 220° C., the PETE plastic degradation ratio increases 39.53% and reaches 100% at 220° C. test. If the reaction temperature continues to increase, there is a slight change in the acidity for the liquid product and the pH value decreases from 5.84 to 5.66 for the reaction temperature at 220° C. and 240° C., respectively.

Figure 3C:
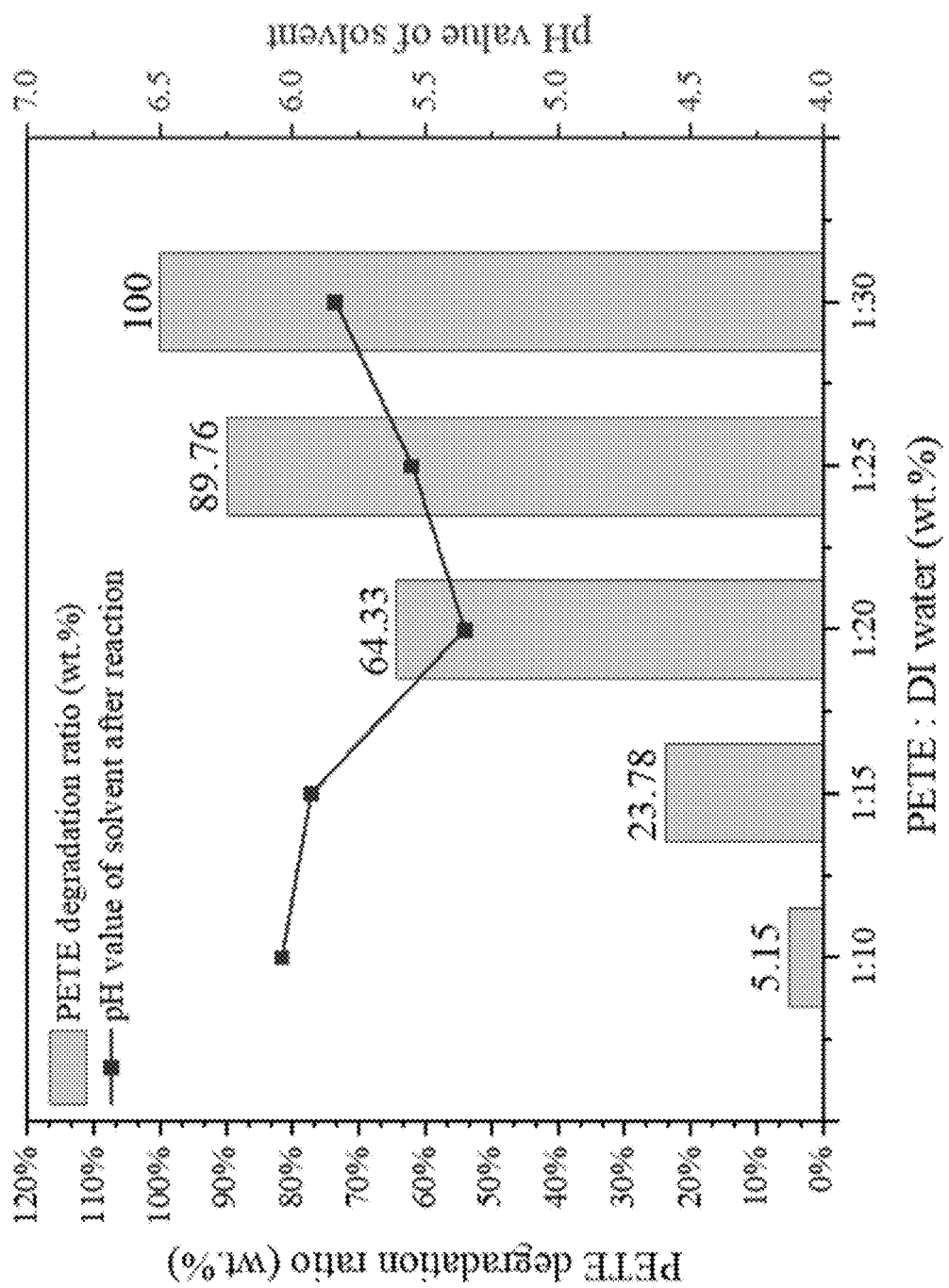
FIG. 3C shows an exemplary plot for the weight ratio of PETE plastic to DI water and solvent pH value.

In FIG. 3C, the operational conditions were: (1) initial pressure: 700 psi $CO_2$ 112; (2) reaction temperature: 220° C.; (3) reaction time: 1.5 hrs and (4) weight ratio of PETE plastic 102 to DI water 108 equals 1:10-1:30. FIG. 3C shows the PETE plastic degradation ratio versus feedstock weight ratio of PETE plastic 102 to DI water 108 in Sc-$CO_2$ reaction system 100. The overall results indicate that the degradation ratio increase with feedstock weight ratio and reaches a degradation ratio of 100% at 220° C. for 1.5 h test. In the test of feedstock weight ratio of PETE plastic to DI water equals 1:10 and 1:15 test, the degradation ratio increased 361.75%, and in the test of feedstock weight ratio of 1:15 and 1:20, the degradation ratio increased 170.52%. The degradation ratio increased only 39.53% and 11.41% between feedstock ratio of 1:20 and 1:25 test, and 1:25 and 1:30 test, respectively. On the other hand, the acidity of liquid product 116 increased with feedstock weight ratio in the low feedstock ratio range (1:10 test, 1:15 test, and 1:20 test). This is likely due to the $CO_2$ being dissolved in the water and generation of ethylene glycol 120 that leads to the increase of the acidity of the liquid product 116. When increasing the feedstock ratio, the acidity decreases with the more water added to the system. This is likely because the two opposite direction effects that the generation of ethylene glycol and $CO_2$ dissolve in water can increase the acidity of liquid sample 116 while the increase of water can dilute the concentration of free hydrogen ion in the liquid sample 116 that lower the acidity of liquid. In FIG. 3C, in the test of feedstock weight ratio of 1:20 test, 1:25 test, and 1:30 test, the acidity of liquid product 116 increases significantly, which likely means the ethylene glycol 120 generation and $CO_2$ 112 dissolve in water 108 effects are stronger than the dilution effect. The degree of PETE plastic degradation ratio increases slower than in the 1:10 test to 1:15 test, and 1:15 to 1:20 test, while the acidity of the liquid product 116 decreases slightly, which means the dilution effect is much stronger than both the ethylene glycol 120 generation and $CO_2$ 112 dissolve in water 108 effect.

3.2. Fourier-Transform Infrared Spectroscopy Analysis

Figure 4A:
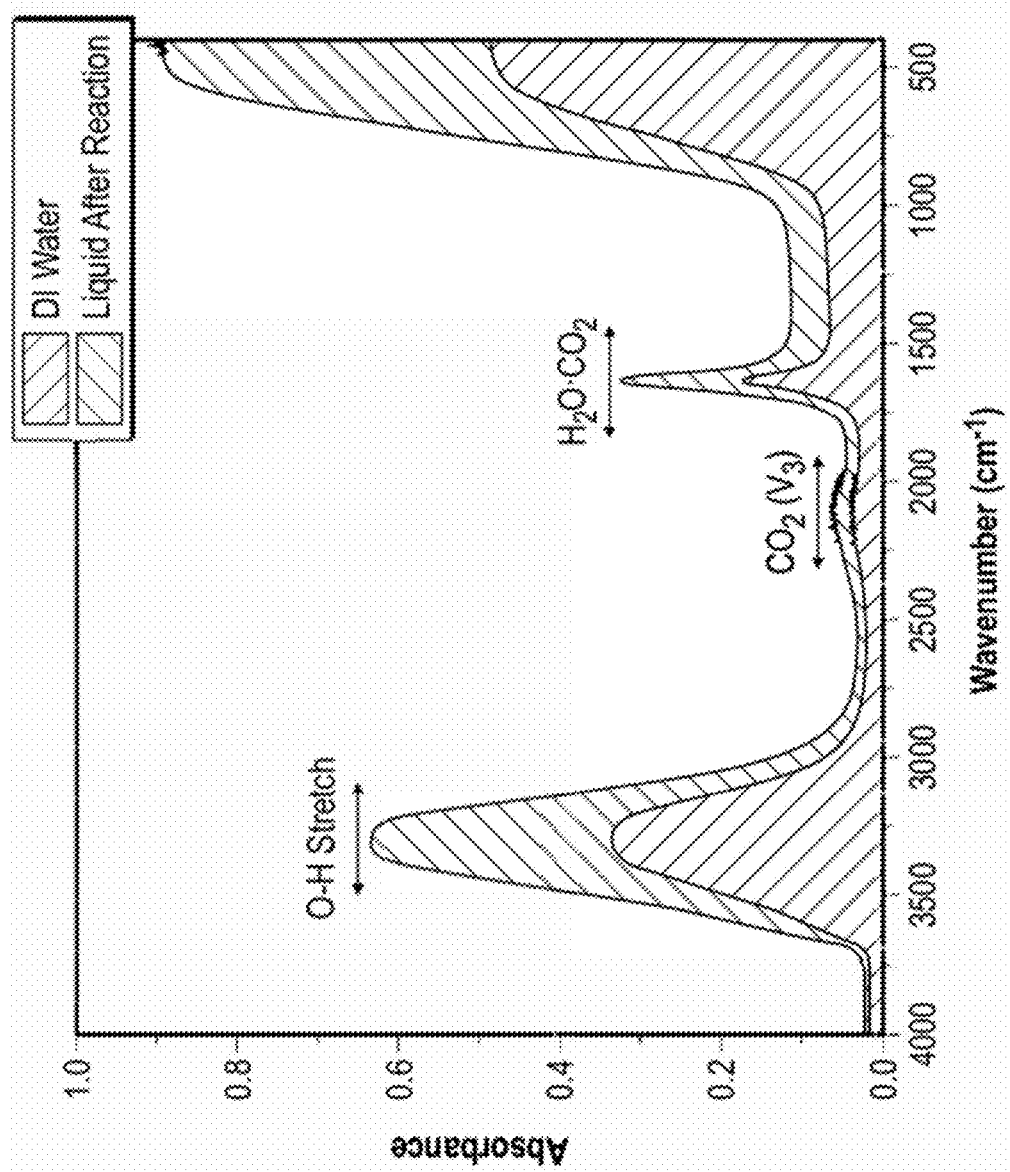
FIGS. 4A-4B show exemplary plots for FTIR analysis of DI water and liquid sample (FIG. 4A) and sheet solid sample and powder solid sample after drying (FIG. 4B).
Figure 4B:
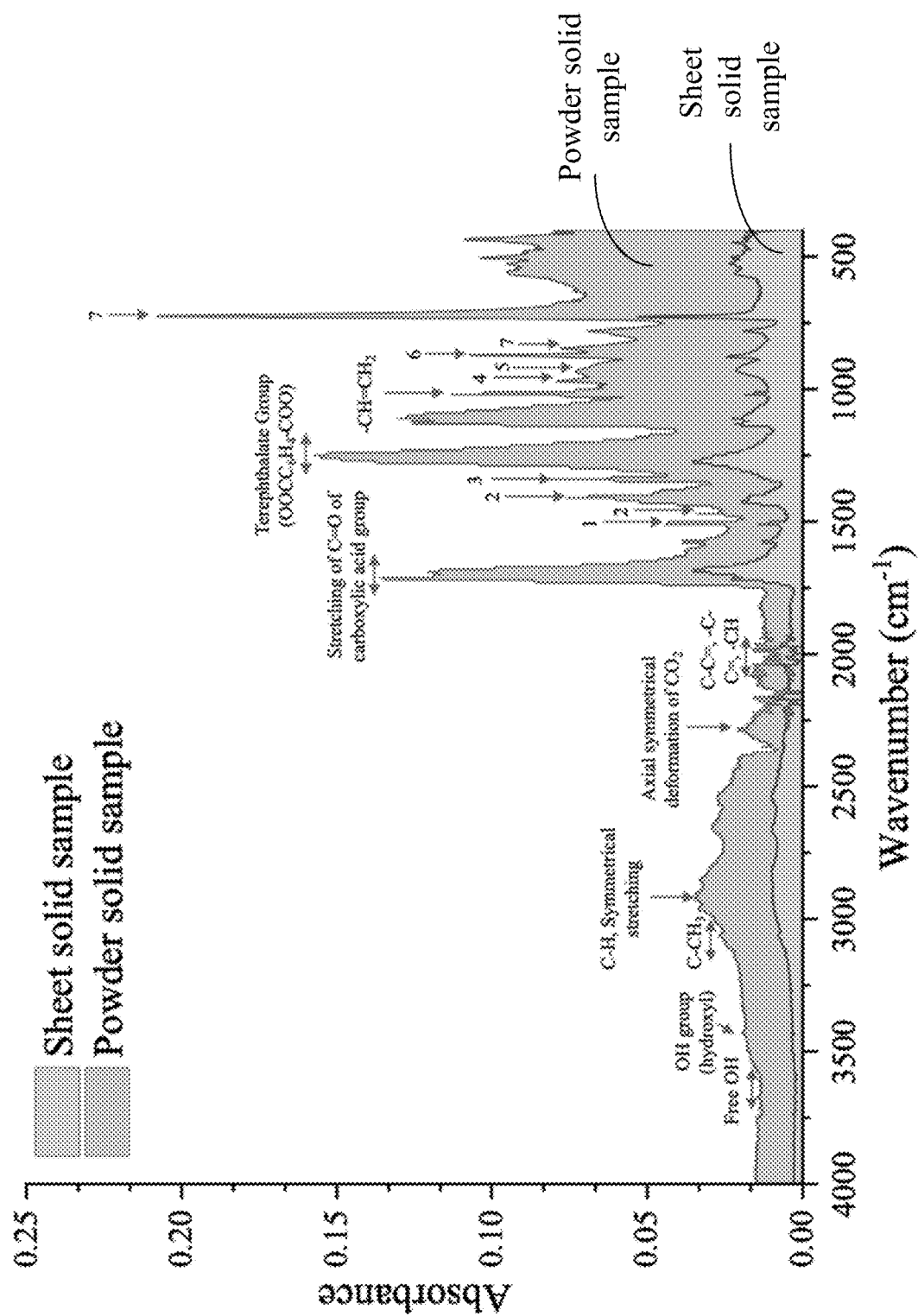

FIGS. 4A-4B show the FTIR results of liquid product 116 and solids products 118. In FIG. 4A, three infrared peaks were detected at 3349 $cm^{-1}$, 2341-2281 $cm^{-1}$ and 1626 $cm^{-1}$ for both DI water and liquid sample. The first peak was due to the broad O—H stretching, the second peak belongs to the $CO_2$ stretch ($v_3$) and the third peak is due to the $H_2O \cdot CO_2$ complex. The $CO_2$, $HCO_3^-$ and $CO_3^{2-}$ related peaks in the liquid sample 116 presented stronger signal strength than that of DI water 108, which is due to partially $CO_2$ 112 was dissolved in the water 108 to form the $H_2CO_3$ or $HCO_3^-$. The stronger O—H peak in a liquid sample 116 is due to the ethylene glycol 120 generation during the reaction.

FIG. 4B shows the FTIR results of powder and sheet solid products collected after drying. Both samples presented peaks in the 3647 $cm^{-1}$, 3432 $cm^{-1}$, 2969 $cm^{-1}$, 2938 $cm^{-1}$, 2077 $cm^{-1}$, 1730 $cm^{-1}$, 1577 $cm^{-1}$, 1240 $cm^{-1}$, 912 $cm^{-1}$, 872 $cm^{-1}$, 795 $cm^{-1}$ and 775 $cm^{-1}$ wavelengths. These peaks belong to Free OH, OH group (hydroxyl), symmetrical stretching of C—H group, C—$CH_3$ vibration, C—C≡, —C—C≡, and —CH group vibration, stretching of C=O of carboxylic acid group, vibrations aromatic skeleton with stretching of C=C, Terephthalate group ($OOCC_6H_4$—COO), —CH=CH group, tetra replaced 1,2,4,5 aromatic rings, vibrations of adjacent two aromatic H in p-substituted compounds and aromatic bands and vibration =C—H benzene ring off-plan, respectively. The FTIR results further show stretching of the C—O group deformation of the O—H and bending and wagging vibrational modes of the ethylene glycol segment and methylene group and vibrations of the ester C—O bond. The detection of OH (hydroxyl) group and C=O of carboxylic acid group peaks are due to the vibration of the hydroxyl group in the generation of monomer units of benzoic acid. The detection of —C═C═ and —CH═CH group peaks are due to the vinyl ester polymerize that was thermally degrading to the yellow or brown polyenes. Discolored polyenes are observed for both samples shown. On the other hand, the sheet sample show peaks in 1453 cm$^{-1}$ indicating the stretching of the C—O group deformation of the O—H group and wagging vibrational modes of the ethylene glycol segment and 1096 cm$^{-1}$ indicating methylene group and vibrations of the ester C—O bond. The literature of bands with assigned vibrational modes from FTIR spectrum for liquid and solid products is shown in Table 1 and Table 2.

TABLE 1

Bands with assigned vibrational modes from FTIR spectrum of the liquid samples

| Absorption bands (cm$^{-1}$) | Bands |
|---|---|
| 3349 | O—H stretch |
| 2341-2281 | $CO_2$ ($v_3$)[16] |
| 1626 | $H_2O \cdot CO_2$[16] |

TABLE 2

Bands with assigned vibrational modes from FTIR spectrum of the solid samples

| Absorption bands (cm$^{-1}$) | Bands |
|---|---|
| 3647 | Free OH |
| 3432 | OH group (hydroxyl) |
| 2969 and 2908 | C—H, symmetrical stretching |
| 2938 | C—CH$_3$ |
| 2350 | Axial symmetrical deformation of $CO_2$ |
| 2077 | C—C≡, —C—C≡, —CH |
| 1730 | Stretching of C═O of carboxylic acid group |
| 1577 | Vibrations aromatic skeleton with stretching C═C |
| 1453 and 1410 | Stretching of the C—O group deformation of the O—H group and wagging vibrational modes of the ethylene glycol segment |
| 1240 and 1124 | Terephthalate group (OOCC$_6$H$_4$—COO) |
| 1096 and 1050 | Methylene group and vibrations of the ester C—O bond |
| 912 | —CH═CH |
| 872 | Aromatic rings 1, 2, 4, 5; Tetra replaced |
| 795 | Vibrations of adjacent two aromatic H in p-substituted compounds and aromatic bands |
| 775 and 503 | Vibration = C—H benzene ring off plan |

3.3. Factors on PET Hydrolysis and Cyclability

Figure 5A:
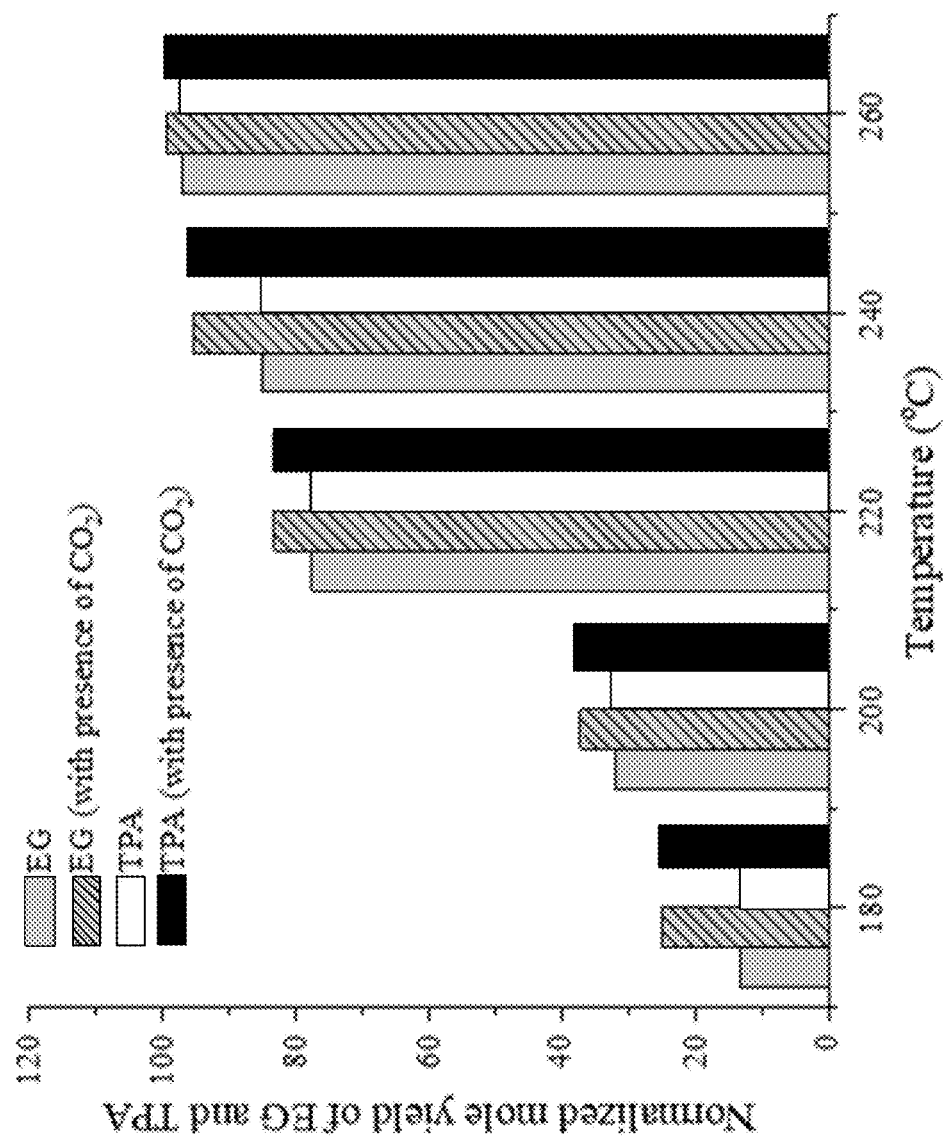
FIGS. 5A-5C show exemplary plots for normalized mole yield of EG and TPA reaction with and without $CO_2$ at various reaction temperature (FIG. 5A), at reaction temperature at 240° C. in various cycles (FIG. 5B), and normalized AA concentration of reaction with and without $CO_2$ in various cycles (FIG. 5C)
Figure 5B:
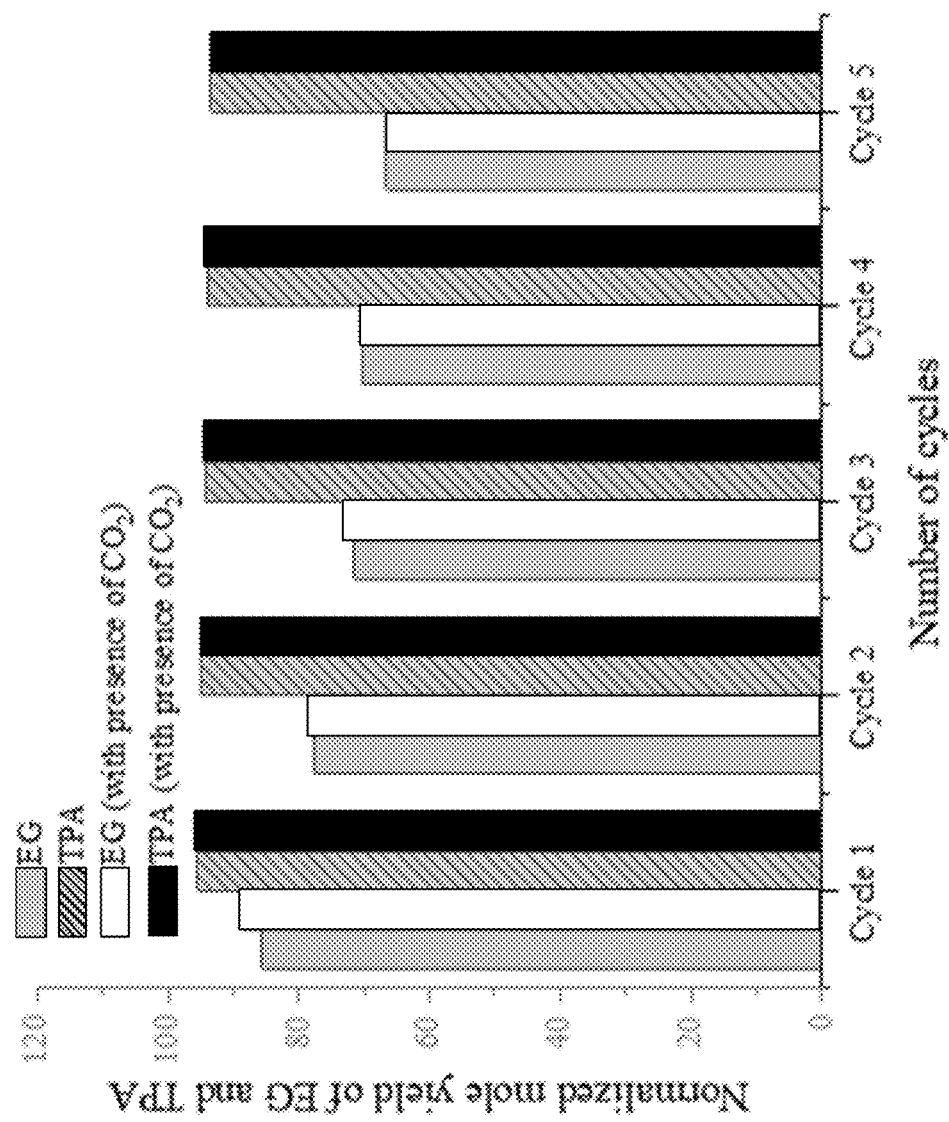

FIG. 5A presents the normalized mole yield of EG and TPA for the reaction with and without $CO_2$ at various reaction temperatures. For both scenarios, the normalized mole yield of both EG and TPA increases with reaction temperatures and in each reaction temperature, the yield of both EG and TPA for reaction with $CO_2$ was higher than that of reaction without $CO_2$. The yield of EG and TPA increases by 88.10%, 16.38%, 7.17%, 12.38% and 2.44%, and 88.01%, 16.36%, 7.06%, 12.28%, and 2.34%, at 180° C., 200° C. 220° C., 240° C., and 260° C. respectively. FIG. 5B shows the normalized mole yield of EG and TPA for the reaction with and without $CO_2$ in five cycles. It was found that the cyclability of the reaction with $CO_2$ was higher than that of the reaction without $CO_2$. The total decreases of mole yield of EG and TPA between $1^{st}$ and $5^{th}$ cycle for the reactions with and without $CO_2$ were 2.15% and 2.26%, and 19.75% and 19.75%, respectively.

Figure 5C:
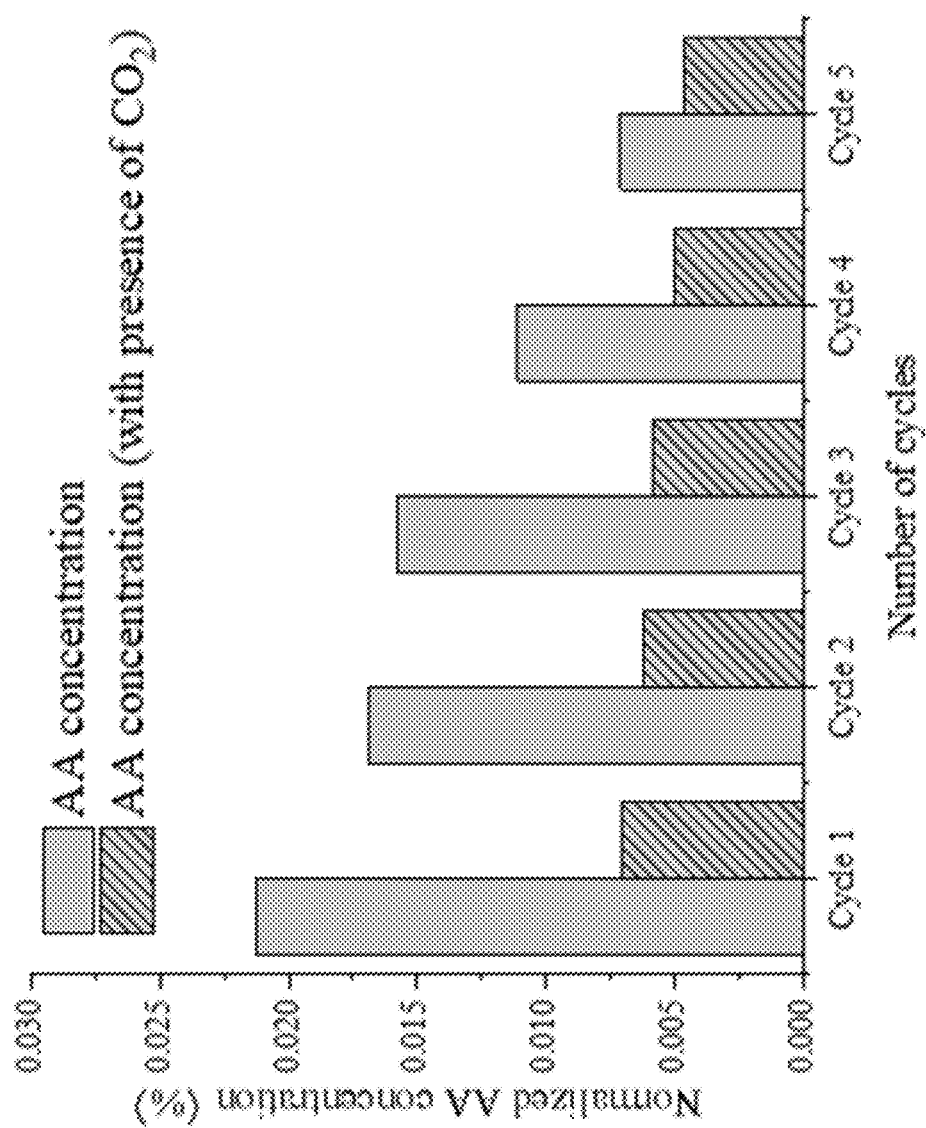

Acetaldehyde (AA) is detected as a minor byproduct for both scenarios in each cycle. The results of AA concentration of cycle tests were shown in FIG. 5C. The source of AA could be attributed to two pathways. The first pathway was the residues in the production of PET bottles, AA concentration in the PET bottles ranges from 10 to 20 ppb. The second pathway could be the oxidation of EG 120. Oxygen sources from both DI water 108 used in the reaction and remaining air in the reactor cavity. Due to the design limitation of the autoclave reactor 104, air cannot be fully driven out of the reactor cavity. To reduce the impact of oxygen on the generation of AA, $O_2$ elimination processes was conducted before each test. The elimination of $O_2$ was conducted with the following procedures. Firstly, placing the 30 g water and 10 g PET 102 in the center of reactor 104 and sealing the reactor 104. Secondly, starting to heat the reactor 104 to 70° C. and unscrewing the gas valve to drive out gas until the pressure of inside reactor 104 equals to atmosphere pressure. Then repeating the second step for three times and resealing the reactor 104. Fourthly, heating the reactor 104 to predetermined temperature and started the reaction. For FIGS. 5A-5C the reaction occurred with DI water to PET ratio of 100 g to 10 g, a reaction time of 1.5 h and an initial $CO_2$ pressure of 350 psi.

3.4. Generated TPA and EG

Figure 6A:
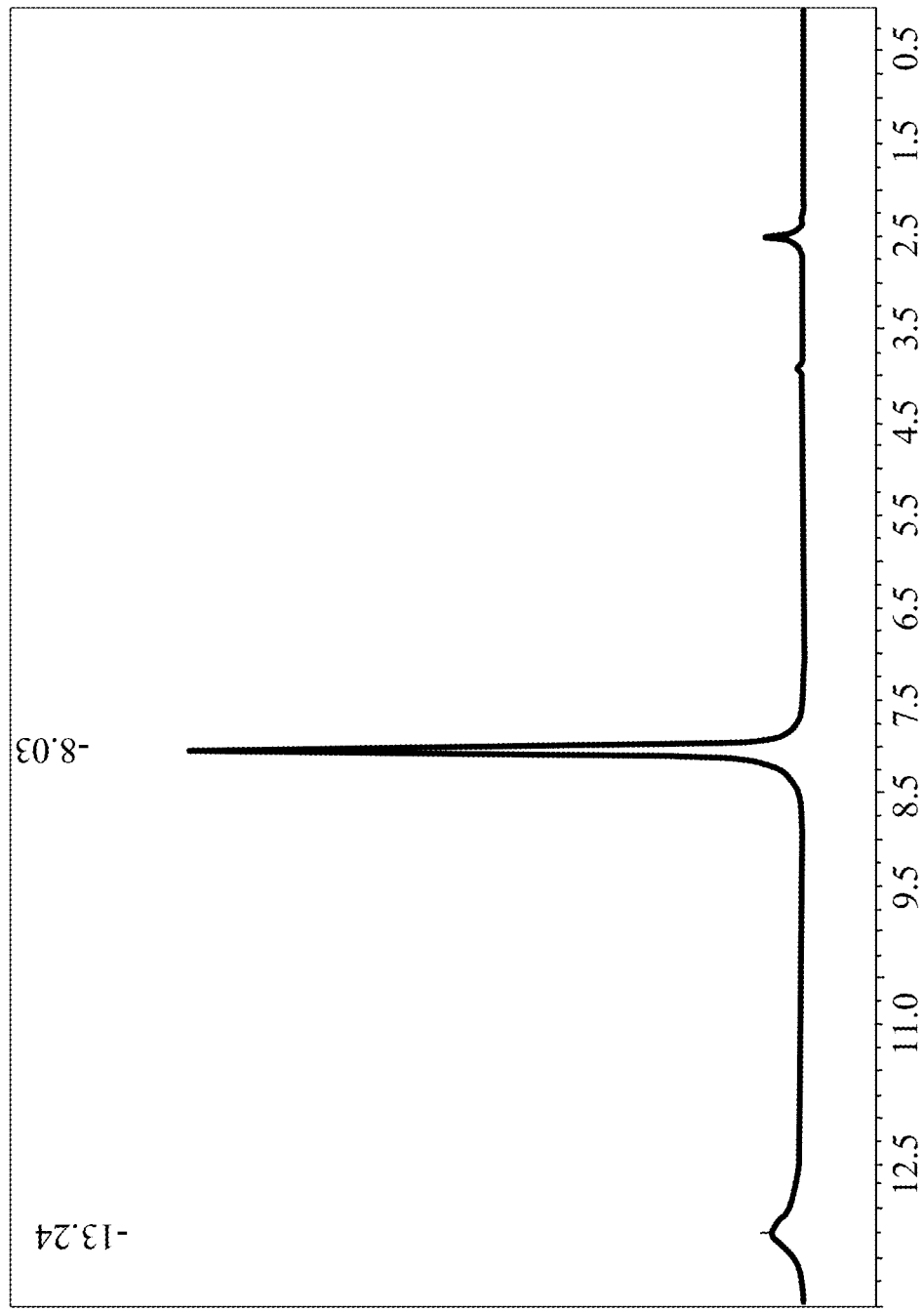
FIGS. 6A-6B show exemplary plots for C NMR results of solid products with solvent of dimethyl sulfoxide (FIG. 6A) and H NMR results of aqueous portion with solvent of $CD_3OD$ (FIG. 6B)
Figure 6B:
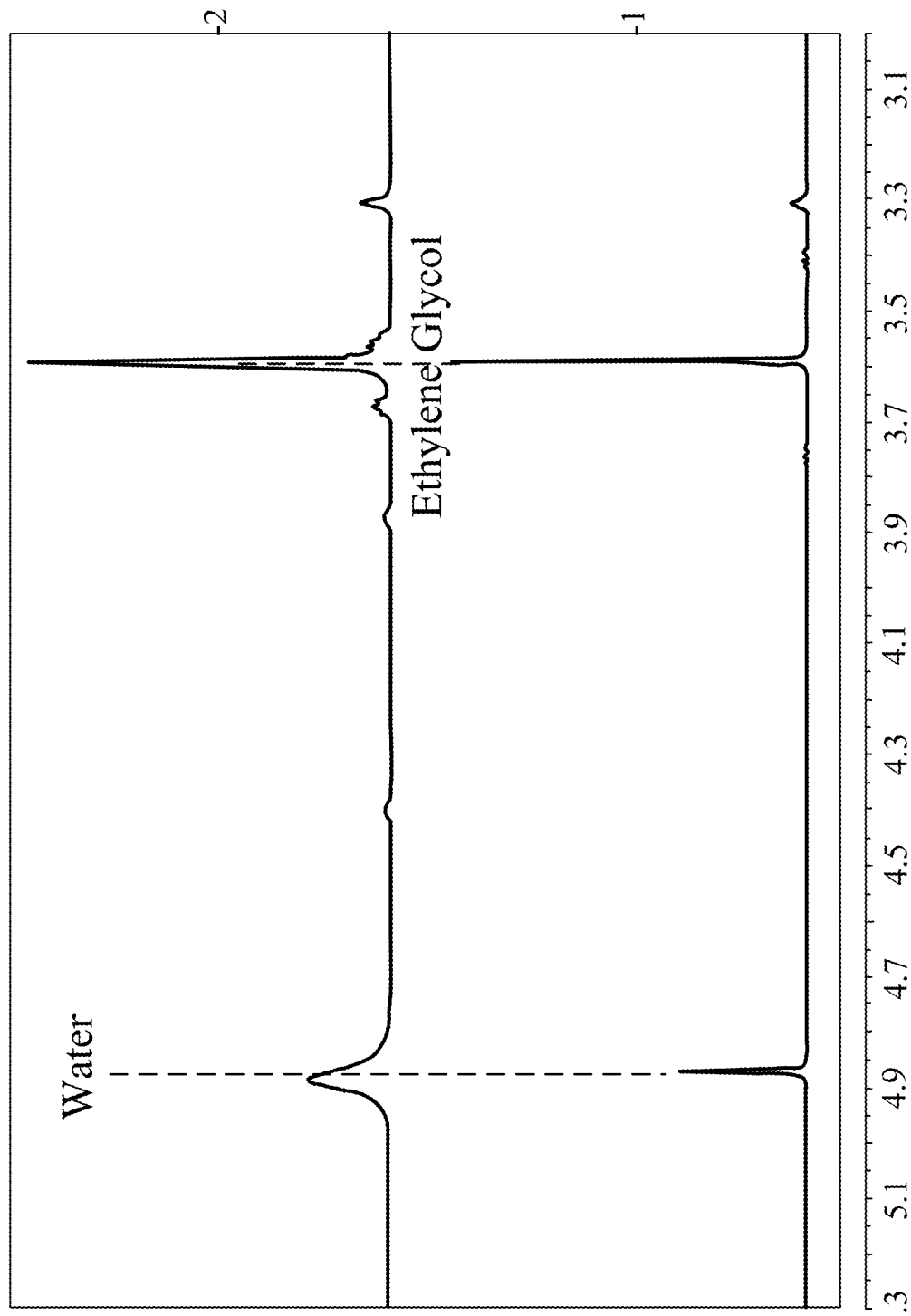
Figure 7A:
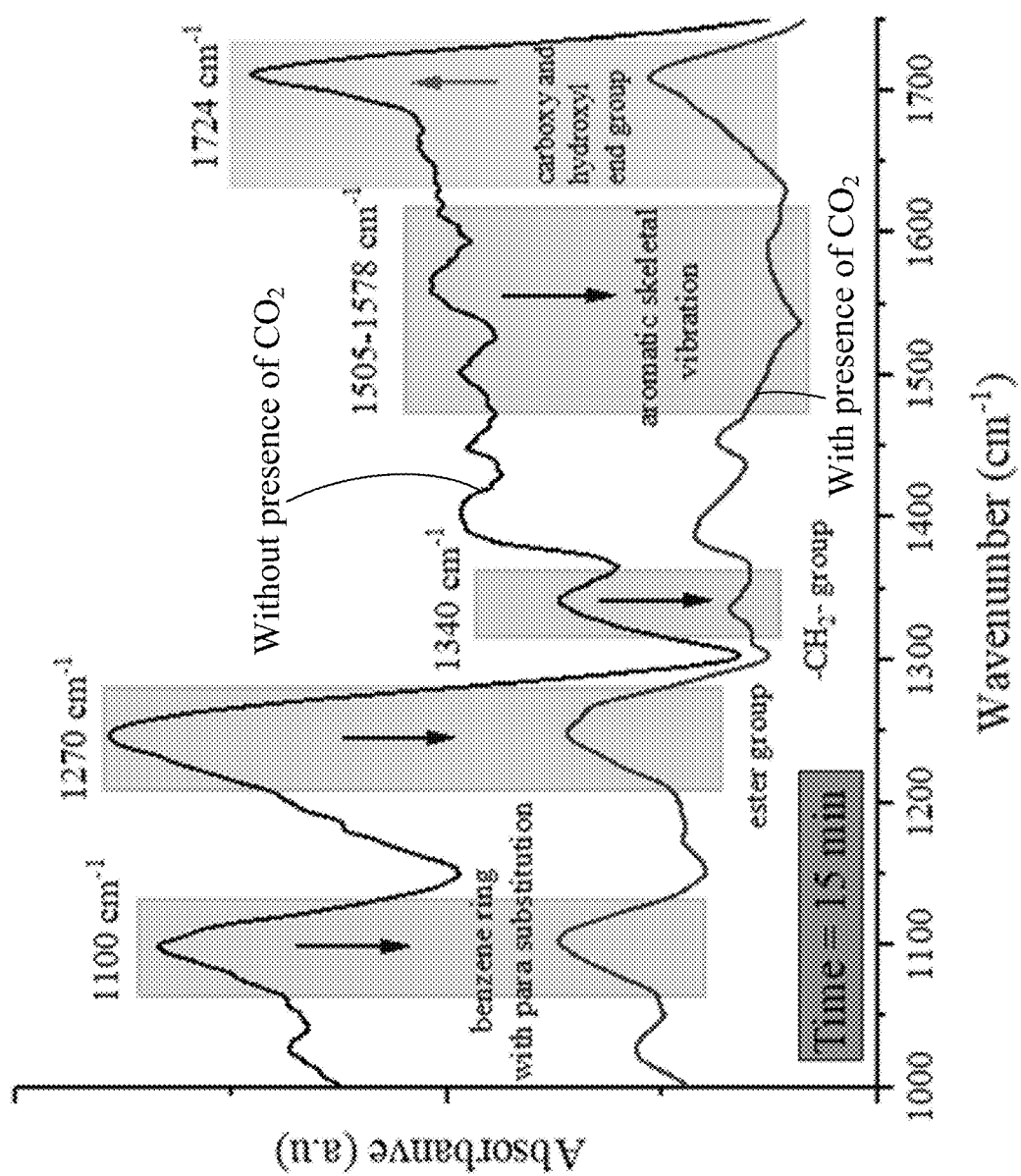
FIGS. 7A-7D show exemplary plots for in situ FTIR results of PET treated with and without $CO_2$ at 15 min and 60 min.
Figure 7B:
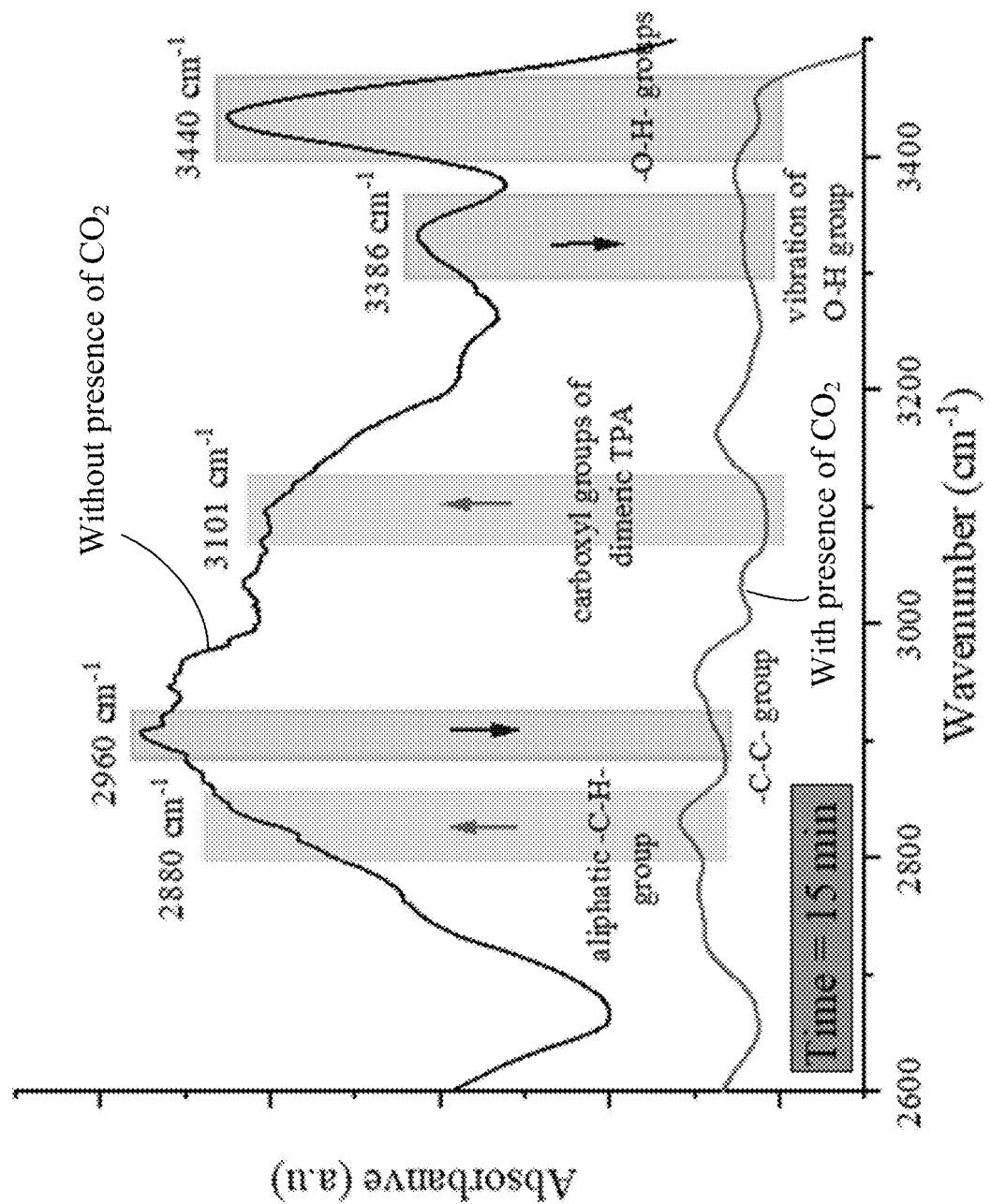
Figure 7C:
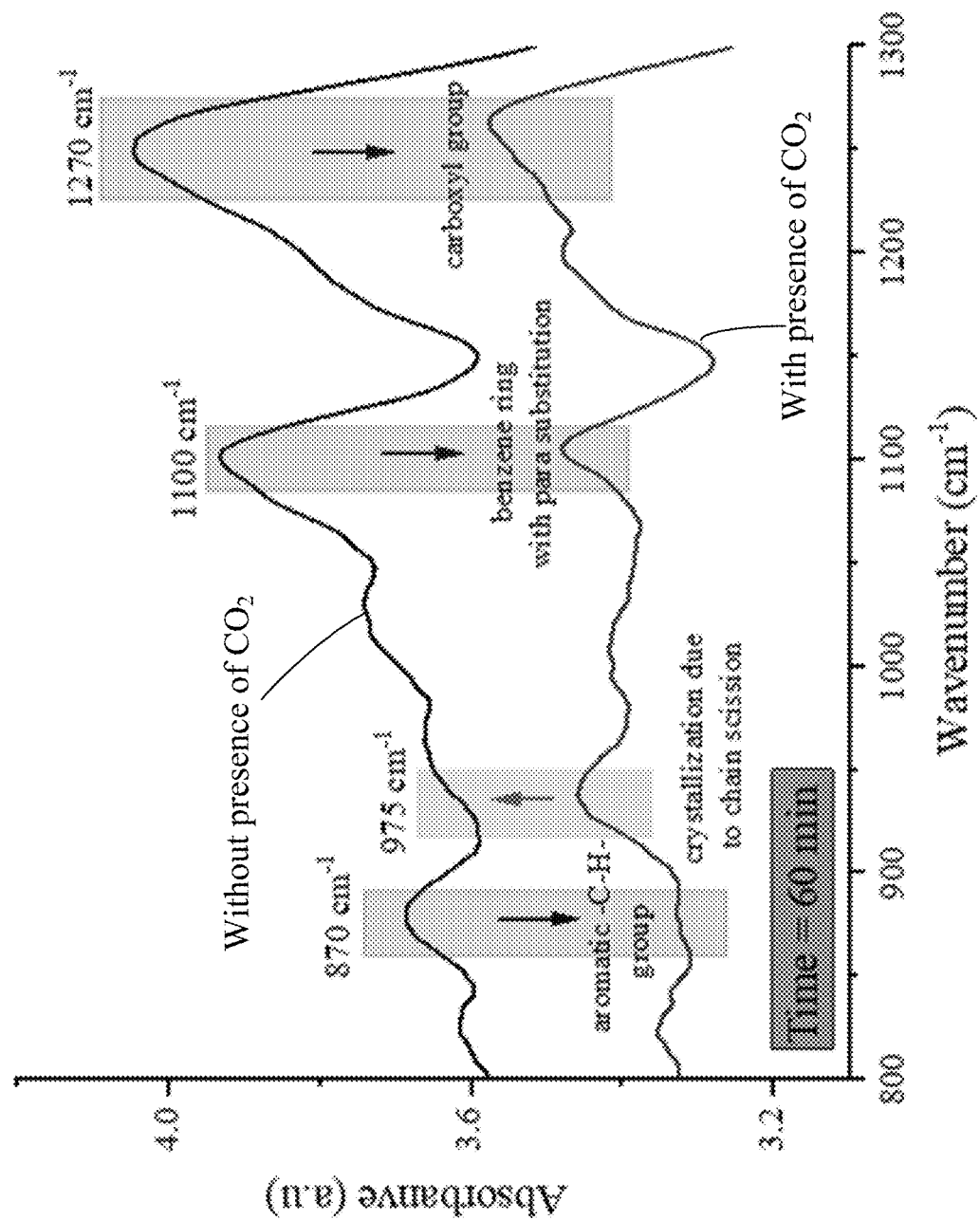
Figure 7D:
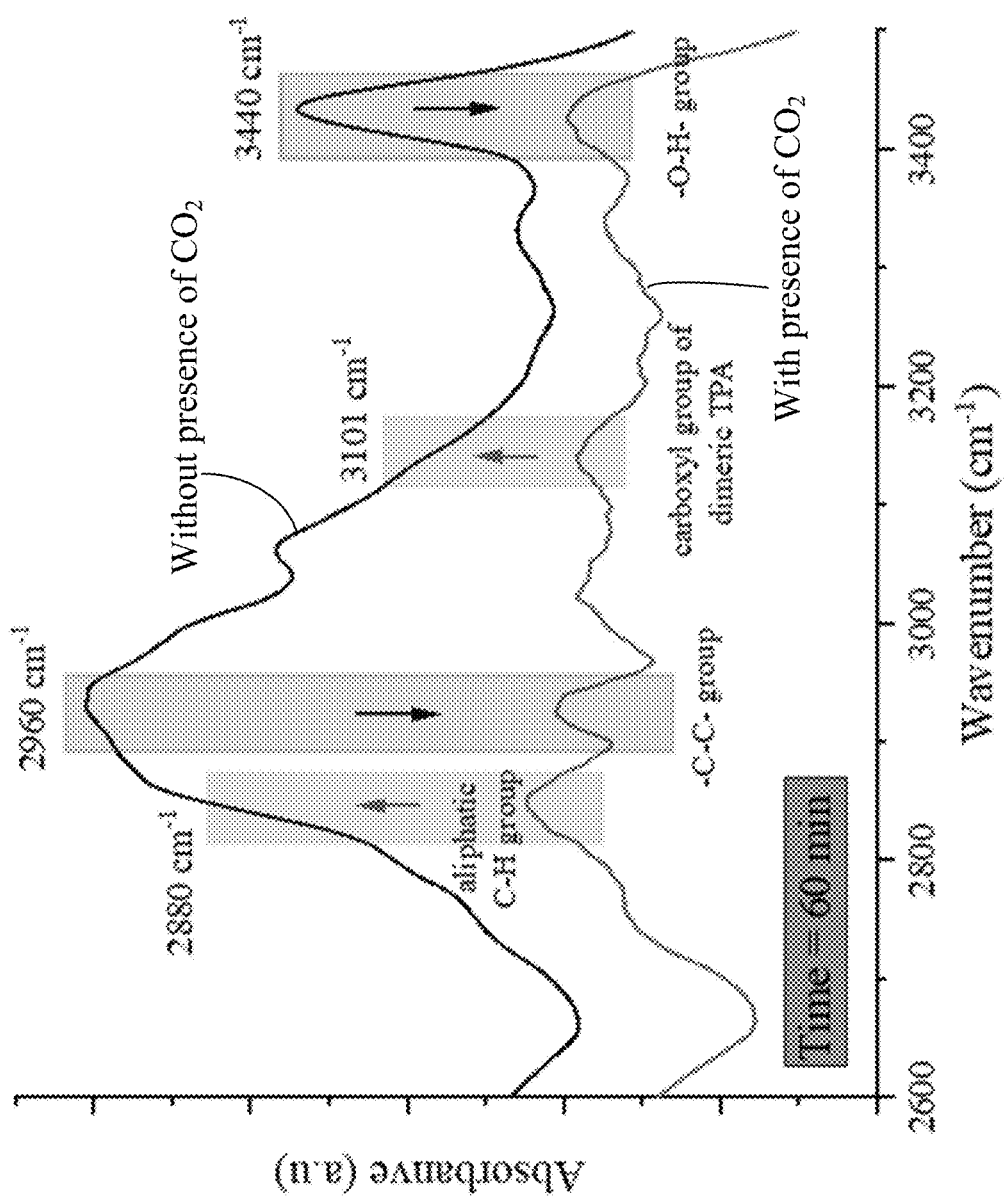

The generated TPA and EG is characterized by $^1$H and $^{13}$C Nuclear Magnetic Resonance (NMR) and the results were presented in FIGS. 6A and 6B.

3.5. PET Treated with and without $CO_2$

In situ FTIR was applied to determine the scission mode of chains of PET treated with and without $CO_2$. The results of PET treated with and without $CO_2$ are shown in FIG. 7A-7D. In FIGS. 7A-7D the reaction temperature is 240° C., the $CO_2$ flow rate is 10 ml/min and the reaction time is 90 min. At 15 min, there is a decrease of peak intensity occurring at peak 1,100 cm$^{-1}$ for the skeletal vibration of benzene ring with para substitution, at peak 1,270 cm$^{-1}$ which represents the stretching vibration of the ester group, at peak 1,340 cm$^{-1}$ that is assigned to the CH$_2$ wagging mode in the trans conformers, at peaks 1,505 cm$^{-1}$ and 1,578 cm$^{-1}$ which belongs to the aromatic skeletal vibration, at peak 2,960 cm$^{-1}$ that is the aliphatic C—H stretching vibration, at peak 3,386 cm$^{-1}$ and at peak 3,440 cm$^{-1}$ which is the vibration of O—H groups. The decrease of peak intensity is due to the scission of ester groups after PET is treated with $CO_2$. It suggested that with the presence of $CO_2$, the conversion of PET initially occurs with the cleaving of ester groups breaking the conjugated system formed by the benzene ring and the ester bond. Due to the scission of the polymer long chain, the originally tight structure between functional groups becomes loose and the corresponding peaks expressed weaker absorbance intensity. Especially, the absorbance intensity of several characteristic peaks, such as 2,960 cm$^{-1}$ and 3,440 cm$^{-1}$, the aliphatic H—C—H groups and vibration of O—H groups almost disappear with the presence of $CO_2$ indicating that the original O═C—O—C structure is broken exposing more end groups. The exposure can be evidenced by the peak intensity increases occurring at 1,724 cm$^{-1}$ that is the stretching vibration of carbonyl groups, $v$(C═O), and 3,101 cm$^{-1}$ which represents the vibration of carboxyl groups of dimeric TPA. More evidence is found at 60 min, where the peak at 870 cm$^{-1}$ that is assigned to the aromatic C—H bond and 1,017 cm$^{-1}$ peak that is the skeletal vibration of benzene ring with para substitution decrease with the presence of $CO_2$. The decrease indicates that the structure formed by the benzene ring and C═O after the ester bond is broken is in an unstable state, the newly formed C=O tends to attract protons and become C—OH or attract OH bonds in the environment to form a stable carboxyl structure. The increase of the peak at 975 cm$^{-1}$ indicates that crystallization is a major phenomenon due to chain scission. Since the environment lacks protons or OH groups, PET in the state of incomplete hydrolysis, and the only hydrogen sources were from the hydrogen in the benzene and C—C bond, which also decrease for both 15 min and 60 min reaction. The decrease can be seen in the peaks at 1,017 cm$^{-1}$ and 2,960 cm$^{-1}$. While the peak at 2,880 cm$^{-1}$, which is assigned to the aliphatic C—H group, increases. The increase indicates that the partial CH$_2$ group was turned into a C—H group reducing the corresponding peak intensity.

3.6. Analysis of Post-Reaction Solution

Figure 8A:
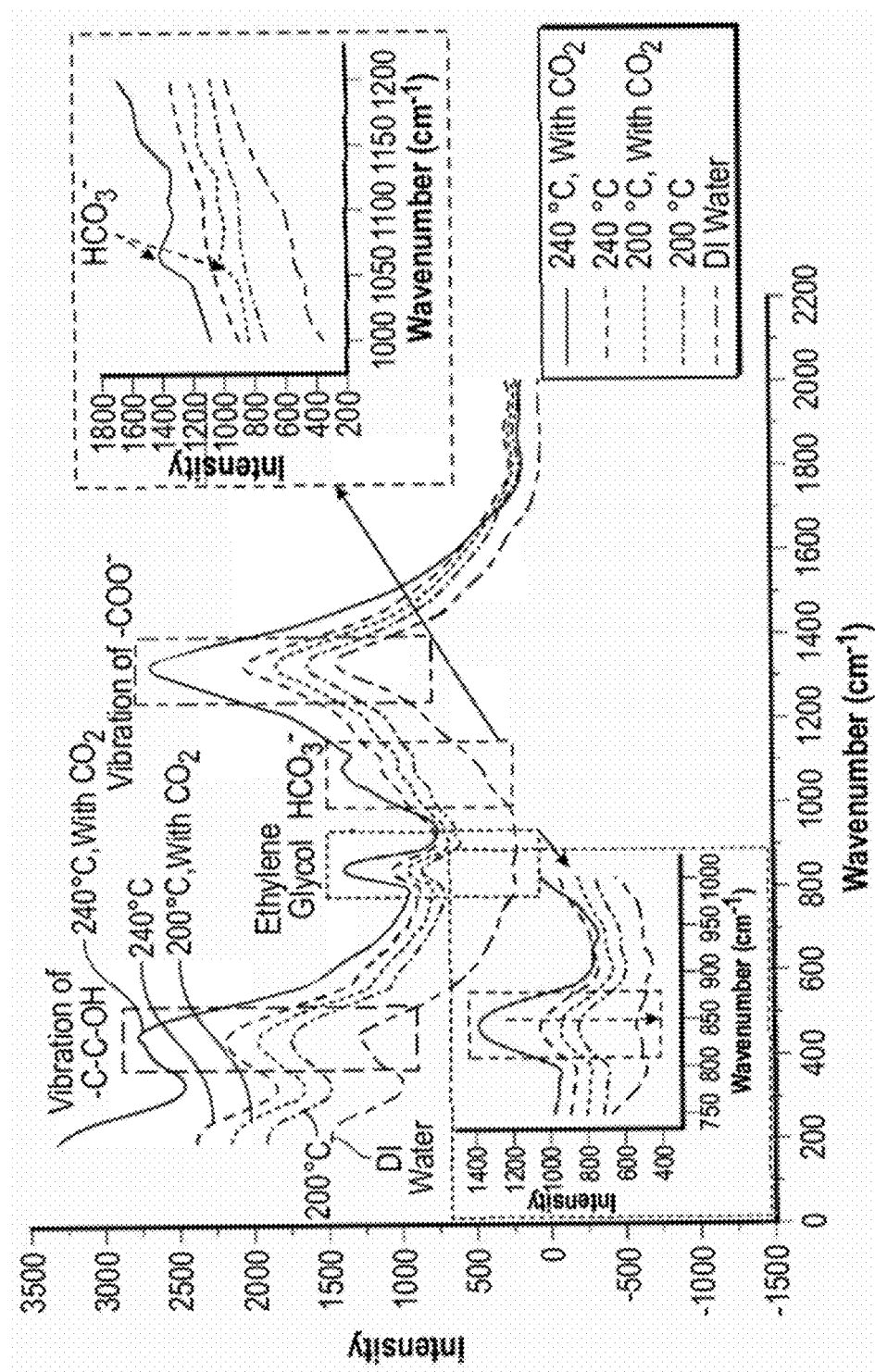
FIGS. 8A-8B show exemplary plots of Raman spectrum of water, solution of 200° C. and 240° C. reaction with $CO_2$, and 220° C. and 240° C. reaction without $CO_2$ at t=0 h (FIG. 8A) and of Raman spectrum of the solution of 240° C. in reaction with $CO_2$ versus time (FIG. 8B)
Figure 8B:
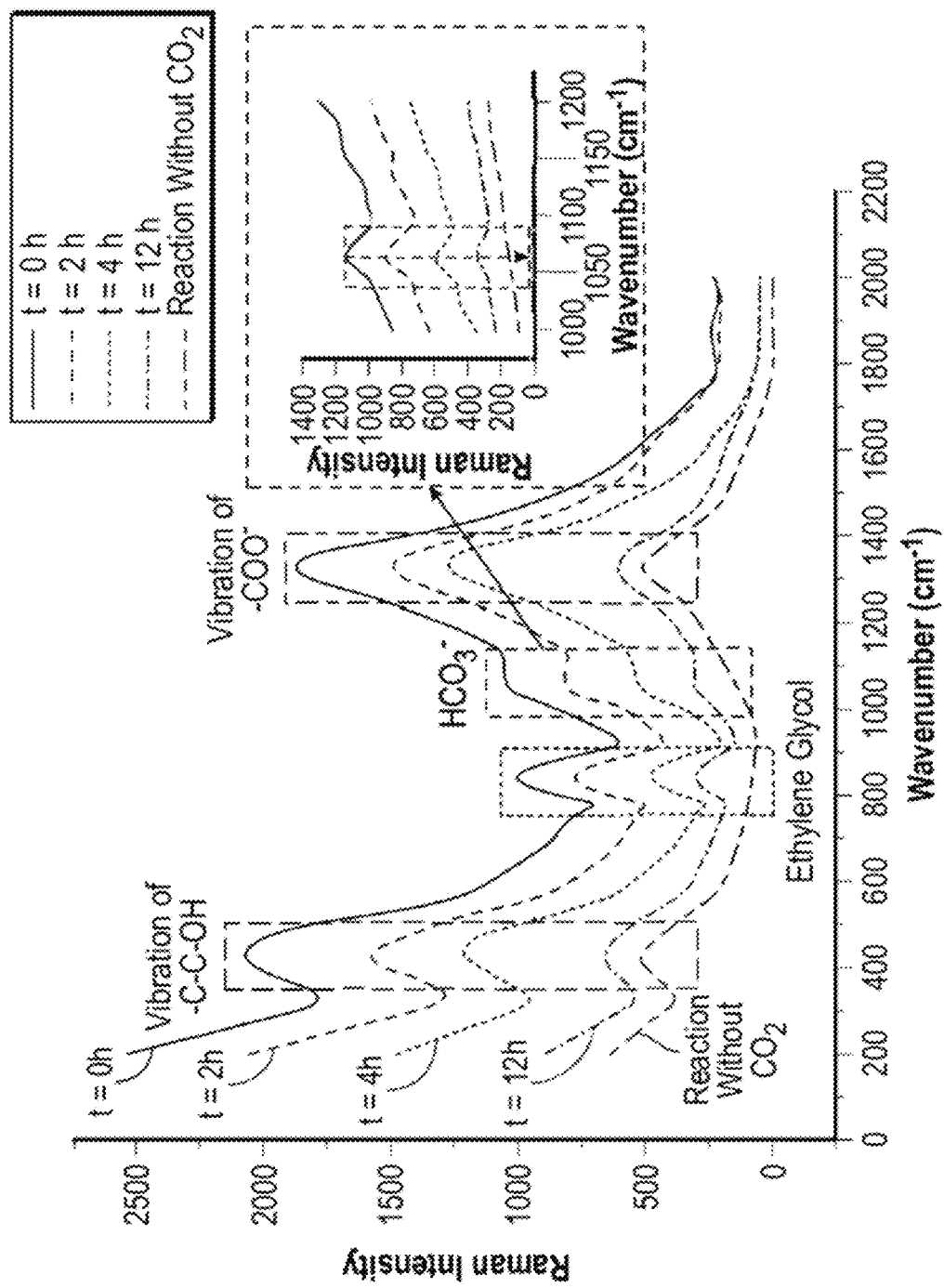

FIG. 8A presents the Raman spectrum of the post-reaction solution of reaction temperature at 200° C. and 240° C. with and without the uses of CO$_2$, respectively. The peak at 439 cm$^{-1}$ is assigned to the vibration of —C—C—OH or —OH groups. The concentration of hydroxyl groups at reactions with CO$_2$ is higher than that of the reaction without CO$_2$ indicating that at the of reaction, more hydroxyl groups are generated due to the cleaving of the ester bond of PET. The same results are observed at the band of 1,351 cm$^{-1}$ which is assigned to the carboxyl groups. The peak of 885 cm$^{-1}$, which assigned to the EG or —O—C—C—O— groups, shows more hydroxyl groups are generated due to the cleaving of the ester bond at the PET molecule. The concentration of EG in the solution at the reaction with CO$_2$ is higher than that of the reaction without CO$_2$. Both concentrations of hydroxyl and carboxyl groups are higher in the presence of CO$_2$ indicating that CO$_2$ can promote the carbon atom in PET to be protonated and the cleaving of the ester bond. As shown in FIG. 8B, the spectrum of bicarbonate is detected at the peak of 1,017 cm$^{-1}$. Although in some aspects, it is difficult to directly measure the concentration of bicarbonate in the solution due to the use of the batch reactor 104. The measurement of bicarbonate may be conducted at the room temperature after releasing pressure from the reactor 104. The remaining bicarbonate in the solution decrease with time sequence. In the reaction with CO$_2$, at t=0 h, the concentration of bicarbonate shown the maximum value while at t=12 h, the concentration of bicarbonate can be hardly measured. In FIG. 8A, the reaction without CO$_2$ at 200° C. and 240° C., no bicarbonate groups were detected.

Figure 9A:
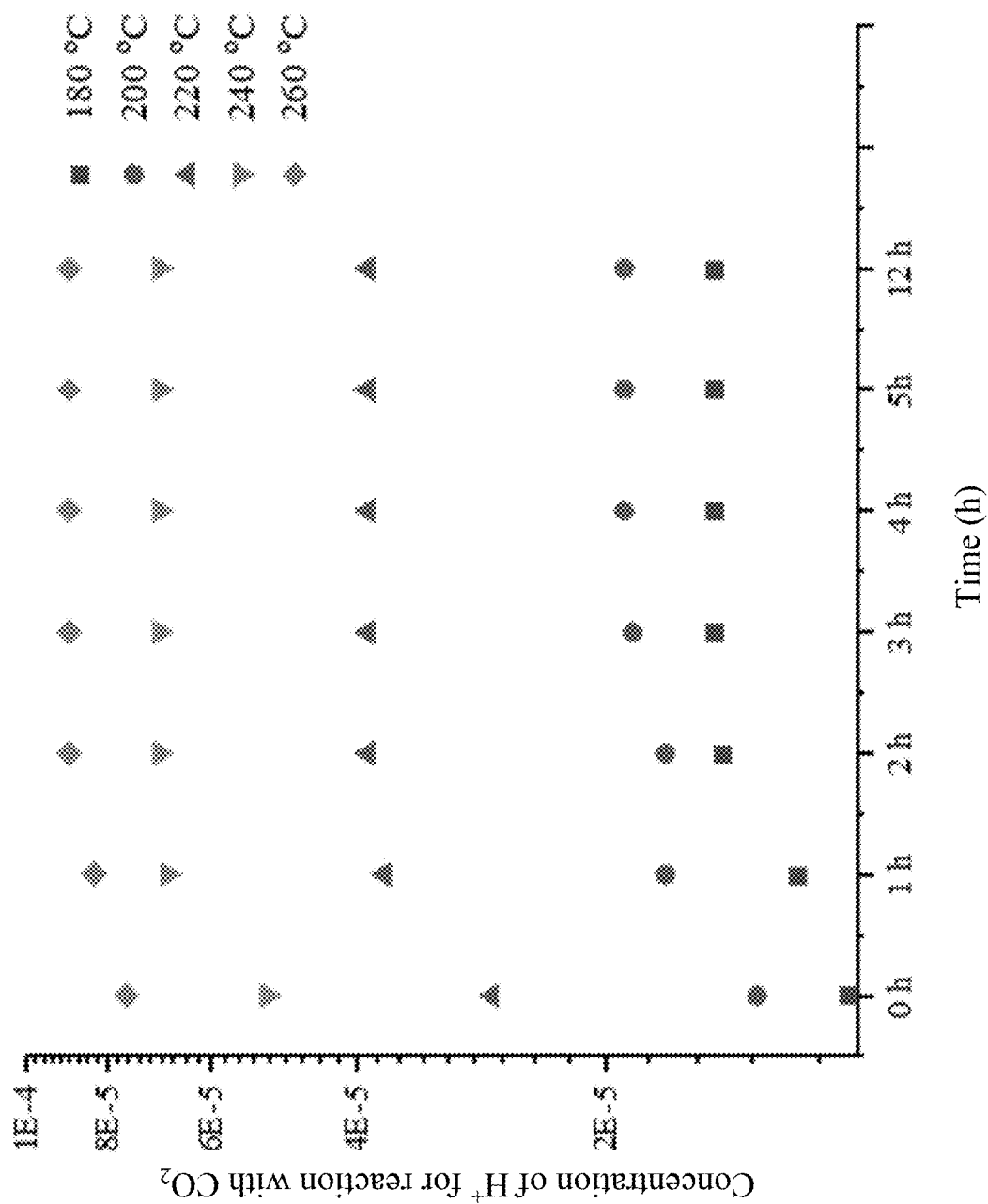
FIGS. 9A-9B show exemplary plots for concentration of $H^+$ of the post-reaction solution for the reaction with $CO_2$ (FIG. 9A) and for concentration of $H^+$ of the post-reaction solution for the reaction without $CO_2$ (FIG. 9B)
Figure 9B:
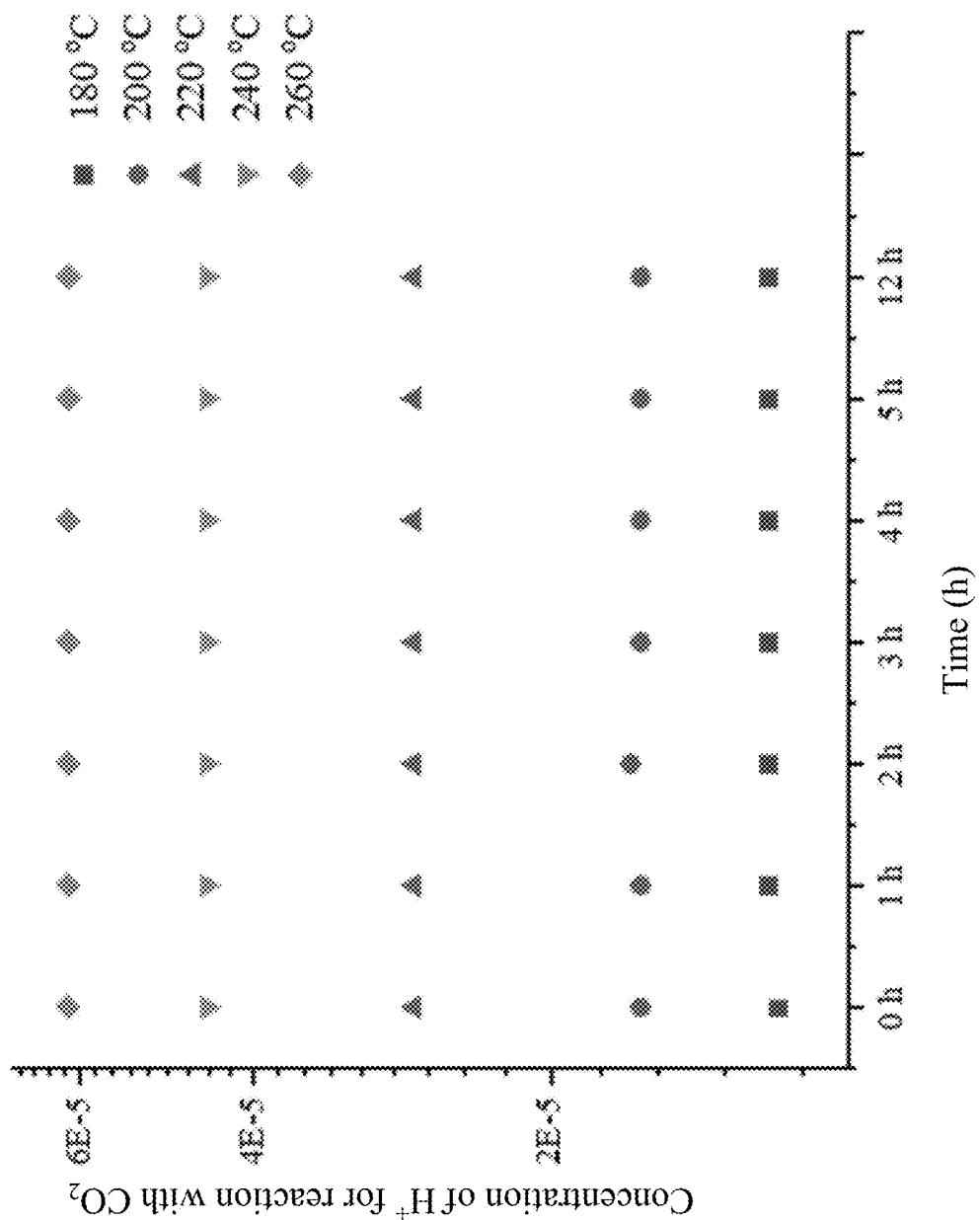

FIGS. 9A and 9B illustrate the concentration of H$^+$ of the post-reaction solution for both scenarios, a reaction with CO$_2$ and a reaction without CO$_2$, versus time. In FIG. 8A, the concentration of H$^+$ of the post-reaction solution for the reaction with CO$_2$ increases with time and stays constant at $t_4$. While the concentration of H$^+$ of the solution for the reaction without CO$_2$ remains constant since $t_0$. For the first scenario, acidification of H$_2$O is due to the generation of carbonic acid derived from the reaction between CO$_2$ and H$_2$O and hydrolysis of generated TPA. The reactions are summarized in (R1) to (R6). One possible reason for the increases of H$^+$ in the solution is that in the process of hydrolysis of PET the hydrogen proton is mainly derived (R3). The hydrolysis of generated TPA or (R5) is suppressed due to the solution being H$^+$ rich which leads to the precipitation of TPA. Hydrolysis of PET was promoted by (R3) due to the hydrogen proton favors for the cleaving of the ester bond of PET. At the end of the reaction, the bicarbonate gets rid of the supercritical CO$_2$ region. The bicarbonate's solubility in water decreases sharply and escapes from the solution in terms of CO$_2$. Although it is difficult to find direct data about the solubility of TPA in acidic environment, the acid dissociation constant (pKa) for CO$_2$ and TPA is 6.35 and 3.51, respectively indicating that the capacity of TPA to dissociate hydrogen ions is stronger than that of CO$_2$. When CO$_2$ recovered to its gaseous state, (R5) and (R6) are strengthened due to the escaping of CO$_2$. Besides, excess H$^+$ in the environment can further promote the reverse reaction of (R2). At $t_4$ and longer time, all the H$^+$ in the solution was derived from the hydrolysis of TPA and the concentration of H$^+$ remains constant.

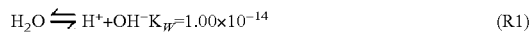

(R1)

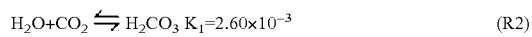

(R2)

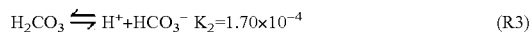

(R3)

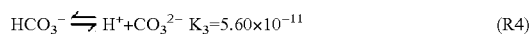

(R4)

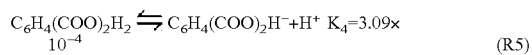

(R5)

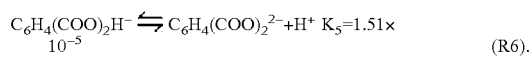

(R6).

3.7. Analysis of Unreacted PET

Figure 10A:
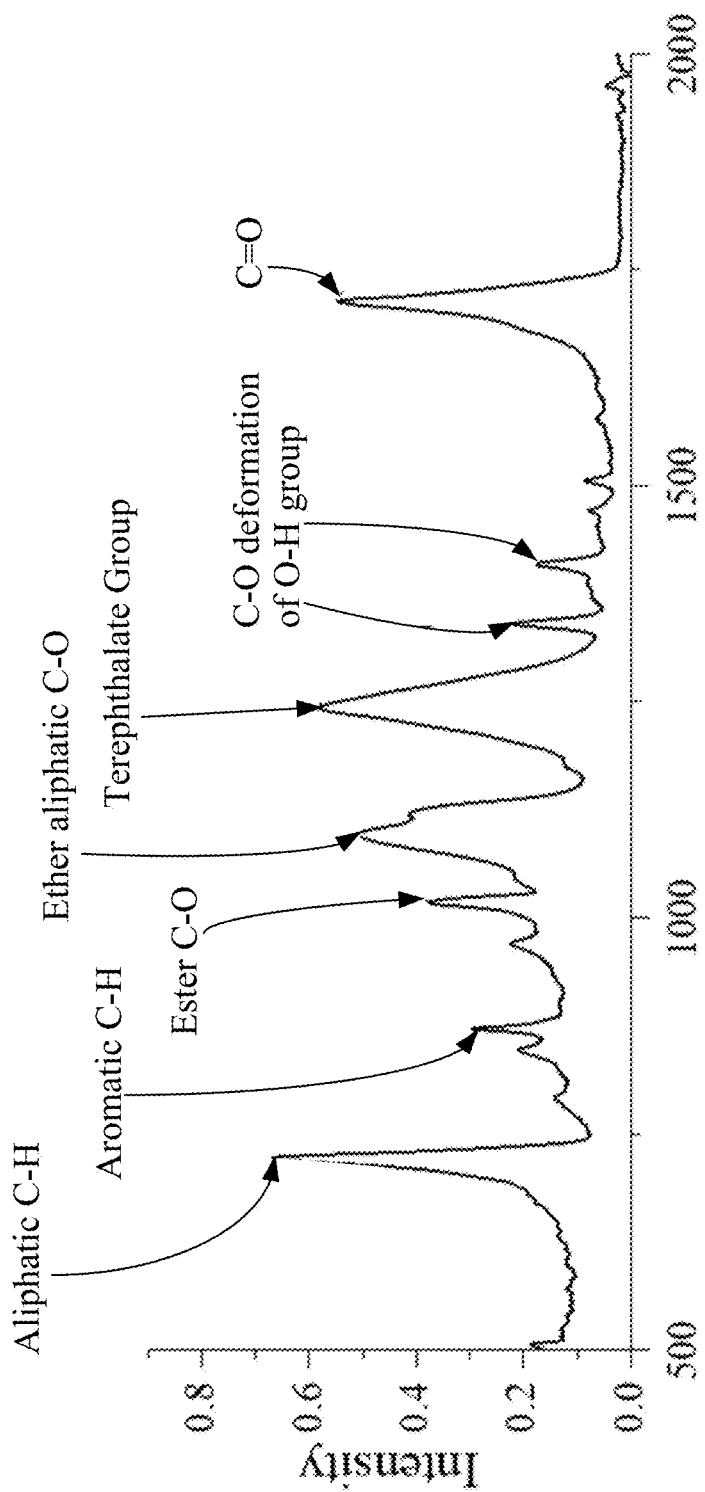
FIGS. 10A-10B show exemplary plots for ATR-IR results of unreacted PET with $CO_2$ and without $CO_2$.
Figure 10B:
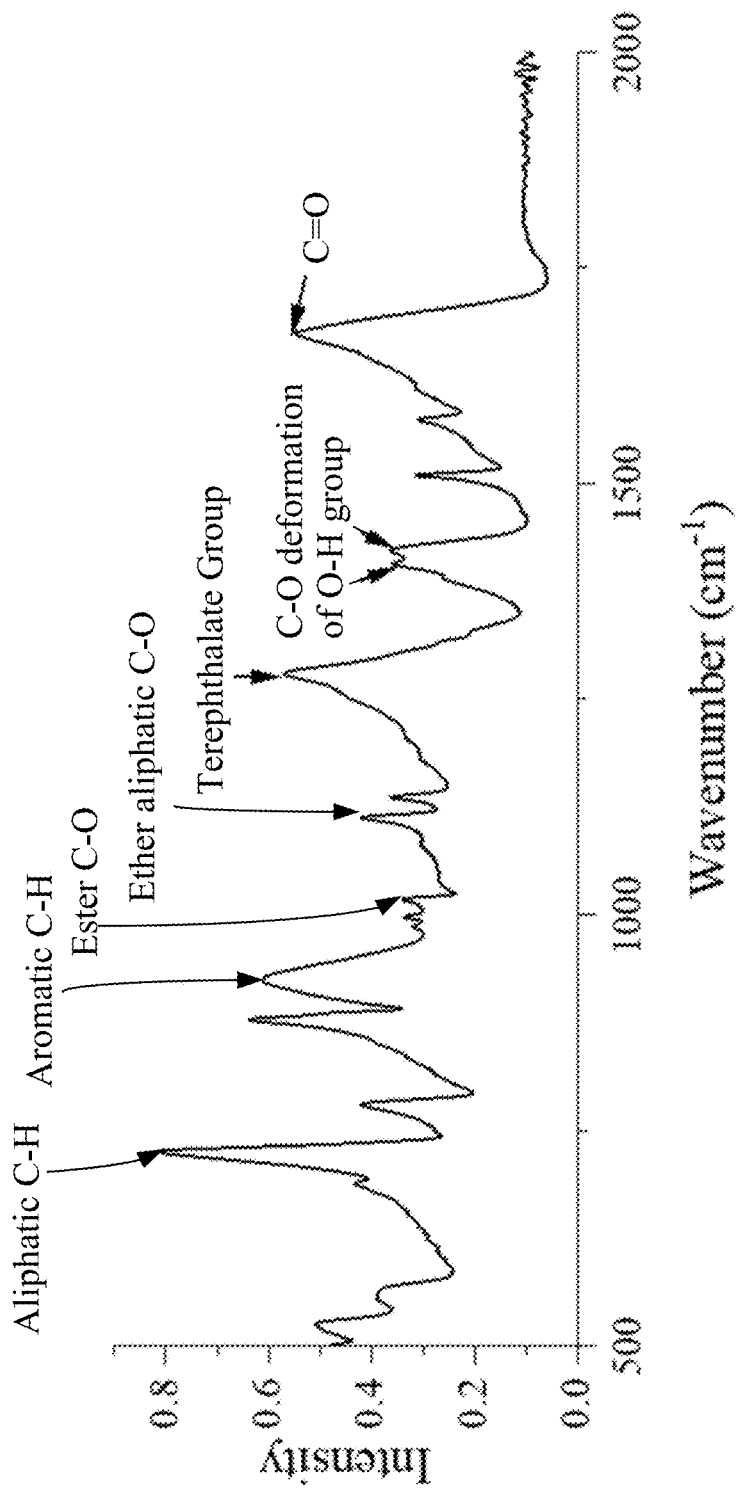

Attenuated Total Reflection-IR (ATR-IR) was applied to study the change of segment, functional groups, and linking bonds of unreacted PET with and without the uses of supercritical CO$_2$. FIGS. 10A and 10B shows both scenarios, the reaction occurring with CO$_2$ and the reaction occurring without CO$_2$. The reaction conditions include a reaction temperature of 160° C., a reaction time of 1.5 h and an initial CO$_2$ pressure of 350 psi. For both scenarios, the peak at 730 cm$^{-1}$ remains unchanged for it is a typical for p-disubstituted aromatics due to the interaction of the polar ester group and the benzene ring. For the reaction with CO$_2$, the unreacted PET shows that most of peaks at different bands become narrowed or weakened, including peaks at 870 cm$^{-1}$, 1453 cm$^{-1}$, and 1715 cm$^{-1}$ corresponding to aromatic C—H bond, C—O deformation of O—H group and ketones C=O bond. The degree of degradation of PET with CO$_2$ is higher than the degradation of PET of without CO$_2$. The unreacted polymer with lower degree of polymerization exhibits lower peak intensity. The stretching, bending, wagging, or other type of vibration of some groups is weakened, and the corresponding peaks expressed a weaker peak intensity as shown in the reaction with CO$_2$. This process will inevitably reduce the degree of polymerization of polymers. The peak intensity increases occur at peaks 1,050 cm$^{-1}$, 1,100 cm$^{-1}$, and 1,245 cm$^{-1}$ that belongs to the ester C—O group, ether aliphatic C—O bond and terephthalate group.

The peak intensity increase is due to the formation of terminal end groups including hydroxyl, carboxyl, and aldehyde groups. The peak intensity changes of function groups indicate that hydroniums carried by supercritical CO$_2$ diffuses into the amorphous regions of PET matrix and induces both the terminal and internal ester groups to cleave. The peak of the C—O deformation of the O—H group typically occurs in primary alcohols that are assigned to the out-of-plane deformation vibration of the H atom in the C—O—H group. The decrease of this peak suggests that the reaction with the presence CO$_2$ leads to the generation of alcoholic hydroxyl groups and the remaining O—H groups of unreacted PET was correspondingly reduced. A slight decrease is observed for ketones C=O groups and is attributed to the generation of carboxyl and aldehyde groups. The observation of the aromatic C—H bond peak is due to the vibrations of the two adjacent symmetrical ester groups in p-substituted compounds changing. The peak may be caused by the change in the electronic environment during the cleaving of the ester bond of PET or the formation of terminal carboxyl groups. Due to both carboxyl and ester groups are the electron-withdrawing group that can lead to the reduction of π electron density of benzene ring that further lead to reducing its ability to undergo electrophilic substitution reactions. The peak intensity of the terephthalate group increased in the reaction with $CO_2$ suggested the carboxyl group connected to the benzene ring is formed. Thus, $CO_2$-derived proton-rich reaction condition can contribute to the cleaving of the ester bond of PET chain that further leads to the converting of aliphatic C—O into alcoholic hydroxyl, and the formation of terephthalate group.

3.8. Reaction Mechanism

Figure 11:
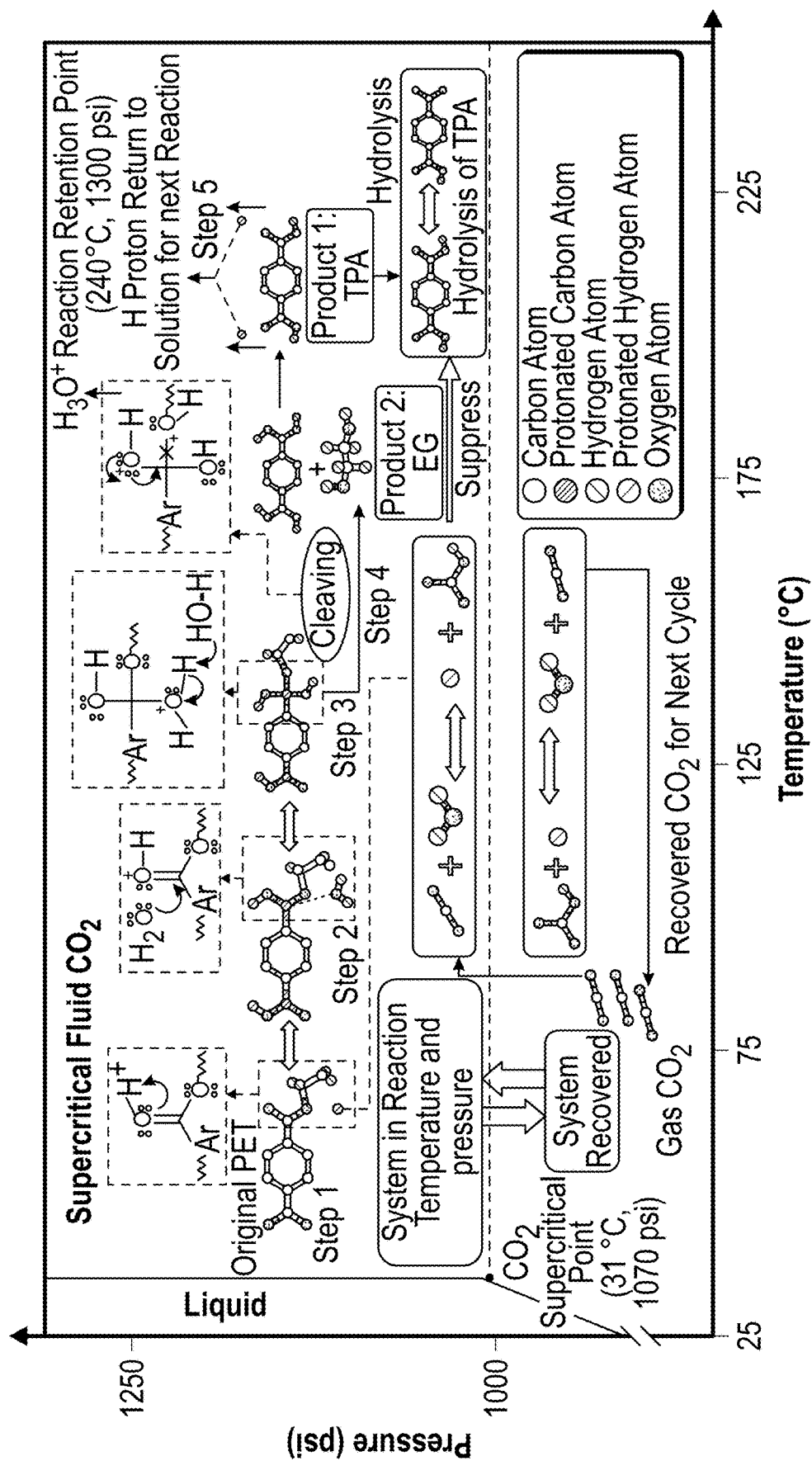
FIG. 11 show an exemplary plot for a mechanism of PET plastic conversion process in supercritical $CO_2$ and water.

The overall conversion process of PET in $CO_2$ and water is shown in FIG. 11. When the system reached the $CO_2$ supercritical point, gas status $CO_2$ turned into the supercritical status and reacts with water to generate hydrogen protons. In Step 1, the water oxygen group, acting as the nucleophile, attacks the electrophilic carbon in the C=O bond of PET. The attack makes the carbon protonated and the carbonyl oxygen atom in the ester bond is converted into the secondary hydroxyl group. In Step 2, the water molecule's hydroxyl oxygen atom combines with the protonated carbon atom to generate hydroxyl groups. The result is observed in the Raman spectrum shown in FIG. 8(b), the peak at 1000-1200 $cm^{-1}$ is due to the vibration of —C—O— groups stretching. In Step 3 the oxygen that came from the water molecule undergoes a deprotonating process to neutralize the charge. In Step 4, the ester bond of PET cleaves which leads to the formation of the terminal carboxyl and hydroxyl groups. As shown in FIG. 8(a), the peak of the Raman spectrum at 439 $cm^{-1}$ and 1,351 $cm^{-1}$ is referred to as the vibration of —C—C—OH and —COO⁻ groups. The intensity of the vibration of —C—C—OH— group is referred to $I_{OH}$ and for —COO⁻ group is referred to as $I_{coo}$. At 240° C. and 220° C. the ratio of $I_{OH}$ and $I_{coo}$ of the reaction with $CO_2$ to the reaction without $CO_2$ equals to 1.0074 and 1.0053, and 1.0227 and 1.0109, respectively. At the same reaction temperature, both concentrations of terminal hydroxyl and carboxyl groups in the condition with $CO_2$ were higher than that of reactions without $CO_2$ indicating that the cleaving of the ester bond of PET was promoted in the $H^+$ rich solution. The generated hydroxyl and carboxyl groups can lead to the generation of TPA and EG. At the same time, deprotonated oxygen ion reveals the carbonyl C=O in the solution and the hydrogen that is connected to the oxygen departs and regenerates the acid catalyst. The acid catalyst leaves the PET molecular in terms of $H_3O^+$ or $H^+$. The hydrogen proton departs from the carbonyl oxygen and goes back into the solution for the next reaction as shown in Step 5. During the reaction, the hydrolysis of TPA is shown in (R5).

When the system is in the supercritical $CO_2$ region, the hydrogen-rich environment can suppress (R5) which leads to the precipitation of TPA. The precipitation of TPA can further lead to promote the conversion of PET. When the system is recovered, excess bicarbonate in the solution will combine with free hydrogen protons and escape from the solution in terms of $CO_2$. As shown in FIGS. 9(a) and 9(b), at the end of the reaction with $CO_2$, the concentration of $H^+$ of the post-reaction solution increases with time and stays constant at $t_4$ while for reactions without $CO_2$, the concentration of $H^+$ remains constant since $t_0$. On one hand, the hydrolysis of TPA or, (R5) is suppressed by hydrogen protons that derives from $CO_2$ reacts with $H_2O$ or (R3) that promote the positive direction of conversion of PET. On the other hand, when $CO_2$ leaves the solution, (R5) is promoted by the leaving of $CO_2$ which leads to the increase of concentration of $H^+$. It is generally believed that the solubility of TPA in the water is extremely small, it matches with experiment result shown in FIG. 9(b) that the concentration of $H^+$ of post-reaction increased slightly from $t_0$ to $t_4$.

The switching of $CO_2$ between supercritical status and gas status enables water to release and retrieve $H^+$ in the process of hydrolysis of PET. In some aspects, it is hard to directly measure the concentration of $H^+$ of solution during the reaction due to the uses of the batch reactor 104. In the supercritical $CO_2$ region, the concentration of $H^+$ may vary from 1.58 to 1.12 mmol/L. The concentration of $H^+$ of the reaction with $CO_2$ at 160 to 240° C. ranges from 2.63E-02 to 2.19E-01 mmol/L at $t_4$ as shown in FIG. 9(a). While for the reaction without $CO_2$ at 160 to 240° C. range from 2.40E-02 to 1.82E-01 mmol/L at $t_0$ as shown in FIG. 9(b). The results indicate that when the hydrolysis of PET reaches its maximum degree, the $H^+$ in the solution is mostly derived from (R3). When the system is recovered, the concentration of $H^+$ derived from $CO_2$ dissolving in water can sharply decrease to 0.001-0.002 mmol/L. Thus, the status change of $CO_2$ in the supercritical and gas region is the dominant reason for the change of the concentration of $H^+$ of the solution.

Thus, the promotion effect of $CO_2$ on the hydrolysis of PET in water can be summarized into two aspects. In the $CO_2$ supercritical region, $CO_2$ reacts with water to form hydrogen-rich environment that leads to the promotion of conversion of PET. The hydrogen-rich environment which can contribute to protonate the carbon atoms of the ester carbonyl group of PET which can lead to the cleaving of the ester bond of PET. The hydrogen-rich environment also prohibits the hydrolysis of TPA during the reaction which can promote the hydrolysis of PET. In the $CO_2$ non-supercritical region, excess bicarbonate will be recovered to water and $CO_2$. The recovered $CO_2$ can be reutilized for the next reaction cycle. Thus, $CO_2$ cannot only promote the conversion of PET but can also be self-recycled without causing external energy consumption.

4. Conclusion

The present disclosure provides an innovative and environmental-friendly process for the degradation of PETE plastic waste under a mild operation condition in the supercritical $CO_2$ and water system. $CO_2$ was found to be an effective catalyst for promoting the hydrolysis of PET and process-green solvent for avoiding secondary pollution of generated products. The process managed to utilize the ability of solvent environment to generate and retrieve $H^+$ via the status switch of $CO_2$ between supercritical and non-supercritical region.

The experiments show that the degradation ratio of PETE plastic can reach as high as 100% when the feedstock weight ratio of PETE plastic to DI water reaches 1:30 at 220° C. reaction temperature and initial $CO_2$ pressure of 700 psi for 1.5 hrs. In the test of feedstock ratio of 1:25 at 220° C. reaction temperature and initial $CO_2$ pressure of 700 psi for 1.5 hrs, the PETE plastic ratio can reach 89.76%. The major products collected were the ethylene glycol that is dissolved in water, benzoic acid monomer crystals and other yellow or brown polyenes as shown in FTIR analysis.

What is claimed is:

1. An environmentally friendly method for recycling polyethylene terephthalate (PETE), comprising:
   pre-loading a supercritical high temperature reactor with a weight ratio of a polyethylene terephthalate and a deionized (DI) water in excess of 1:10;
   injecting $CO_2$ into the supercritical high temperature reactor at an injection pressure in excess of 500 psi;
   sealing the weight ratio of the polyethylene terephthalate and the deionized water and the $CO_2$ within the supercritical high temperature reactor;
   setting a reaction temperature of the supercritical high temperature reactor with a controller, wherein the reaction temperature is in excess of 160° C.;
   heating the weight ratio of the polyethylene terephthalate and the deionized water and the $CO_2$ within the supercritical high temperature reactor to the reaction temperature; and
   reacting the weight ratio of the polyethylene terephthalate and the deionized water and the $CO_2$ within the reactor for a reaction duration in excess of 0.25 hrs.

2. The method of claim 1, wherein the weight ratio of the polyethylene terephthalate and the deionized (DI) water is ≤1:30.

3. The method of claim 1, wherein the reaction temperature is 240° C.

4. The method of claim 1, wherein the reaction time is 2.0 hrs.

5. The method of claim 1, further comprising:
   collecting the $CO_2$ after the completion of the reaction from the supercritical high temperature reactor.

6. The method of claim 1, further comprising:
   collecting a solid product reactant from the supercritical high temperature reactor, wherein the solid product reactant comprises polyenes and benzoic acid crystals; and
   collecting a liquid product reactant from the supercritical high temperature reactor, wherein the liquid product reactant comprises ethylene glycol.

* * * * *

UNITED STATES PATENT AND TRADEMARK OFFICE
CERTIFICATE OF CORRECTION

PATENT NO. : 11,920,005 B2
APPLICATION NO. : 17/246204
DATED : March 5, 2024
INVENTOR(S) : Maohong Fan, Wenyang Lu and Jinwen Zhang It is certified that error appears in the above-identified patent and that said Letters Patent is hereby corrected as shown below:

In the Claims

Column 16, Claim 3, Line 5 change "is 240° C" to --is $\leq$ 240° C.--

Column 16, Claim 4, Line 6 change "reaction time is 2.0" to --reaction time is $\leq$ 2.0--

Signed and Sealed this
Twentieth Day of August, 2024

Katherine Kelly Vidal
*Director of the United States Patent and Trademark Office*